US006885388B2

(12) United States Patent
Gunter et al.

(10) Patent No.: US 6,885,388 B2
(45) Date of Patent: Apr. 26, 2005

(54) METHOD FOR AUTOMATICALLY GENERATING LIST OF MEETING PARTICIPANTS AND DELEGATION PERMISSION

(75) Inventors: Carl A. Gunter, Philadelphia, PA (US); Thomas J. Remaley, Roseville, MN (US); David J. Ruggieri, Flourtown, PA (US)

(73) Assignee: Probaris Technologies Inc., Philadelphia, PA (US)

(*) Notice: Subject to any disclaimer, the term of this patent is extended or adjusted under 35 U.S.C. 154(b) by 446 days.

(21) Appl. No.: 09/842,269

(22) Filed: Apr. 25, 2001

(65) Prior Publication Data

US 2002/0158904 A1 Oct. 31, 2002

(51) Int. Cl.[7] .......................... G09G 5/00; G06F 15/16; G06F 15/173
(52) U.S. Cl. ...................... 345/751; 345/753; 345/754; 345/755; 345/757; 345/758; 709/204; 709/205; 709/225; 709/229
(58) Field of Search ................................ 345/751–755, 345/757–759, 172; 709/225, 229, 204–207

(56) References Cited

U.S. PATENT DOCUMENTS

| | | | |
|---|---|---|---|
| 4,816,655 A | 3/1989 | Musyck et al. .............. 235/380 |
| 4,868,877 A | 9/1989 | Fischer .......................... 380/25 |
| 5,214,702 A | 5/1993 | Fischer .......................... 380/30 |
| 5,220,604 A | 6/1993 | Gasser et al. |
| 5,261,002 A | 11/1993 | Perlman et al. ................ 380/30 |
| 5,299,263 A | 3/1994 | Beller et al. |
| 5,315,657 A | 5/1994 | Abadi et al. ................... 380/25 |
| 5,339,403 A | 8/1994 | Parker .......................... 395/425 |
| 5,412,717 A | 5/1995 | Fischer ........................... 380/4 |
| 5,412,727 A | 5/1995 | Drexler et al. ................. 380/24 |
| 5,455,953 A | 10/1995 | Russell ........................ 395/739 |
| 5,475,758 A | 12/1995 | Kikuchi ......................... 380/25 |
| 5,495,533 A | 2/1996 | Linehan et al. |
| 5,530,235 A | 6/1996 | Stefik et al. |
| 5,542,046 A | 7/1996 | Carlson et al. .............. 395/186 |
| 5,577,120 A | 11/1996 | Penzias |
| 5,583,993 A | 12/1996 | Foster et al. |
| 5,615,268 A | 3/1997 | Bisbee et al. .................. 380/25 |
| 5,649,099 A | 7/1997 | Theimer et al. |
| 5,659,616 A | 8/1997 | Sudia .......................... 380/23 |
| 5,659,617 A | 8/1997 | Fischer |

(Continued)

OTHER PUBLICATIONS

Tuomas Aura, "Distributed Access–Rights Management With Delegation Certificates", Secure Internet Programming (LNCS), 1999 Springer–Verlag, pp. 1–25.

Kakkar, et al., "Certificate Distribution With Local Autonomy", International Workshop on Active Networks, Oct. 2000, pp. 1–19.

Blaze, et al., "Decentralized Trust Management", Proc. IEEE Conference on Security and Privacy, May 1996, pp. 1–23.

(Continued)

Primary Examiner—Ba Huynh
Assistant Examiner—Nhon D Nguyen
(74) Attorney, Agent, or Firm—Morgan Lewis & Bockius LLP

(57) ABSTRACT

A method and system automatically generate a list of participants physically present at a meeting and distribute permission to the participants. Identity and key information is collected from the participants during the meeting using at least one personal area network. The identity and key information is stored on a delegation device. Permission to access the services is distributed to the participants over at least one personal area network using the delegation device. The delegation device may include an access control matrix or moveable icons for organizing and distributing participant and permission information.

5 Claims, 22 Drawing Sheets

U.S. PATENT DOCUMENTS

| | | | | |
|---|---|---|---|---|
| 5,689,642 | A * | 11/1997 | Harkins et al. | 709/207 |
| 5,694,471 | A | 12/1997 | Chen et al. | 380/25 |
| 5,754,654 | A | 5/1998 | Hiroya et al. | 380/24 |
| 5,757,920 | A | 5/1998 | Misra et al. | 380/25 |
| 5,761,309 | A | 6/1998 | Ohashi et al. | 380/25 |
| 5,784,463 | A | 7/1998 | Chen et al. | 380/21 |
| 5,805,846 | A * | 9/1998 | Nakajima et al. | 345/753 |
| 5,872,841 | A * | 2/1999 | King et al. | 379/210.01 |
| 5,872,848 | A | 2/1999 | Romney et al. | 380/25 |
| 5,901,284 | A | 5/1999 | Hamdy-Swink | 395/186 |
| 5,903,882 | A | 5/1999 | Asay et al. | 705/44 |
| 5,933,498 | A | 8/1999 | Schneck | |
| 5,943,423 | A | 8/1999 | Muftic | 380/25 |
| 5,949,414 | A * | 9/1999 | Namikata et al. | 345/753 |
| 5,960,085 | A | 9/1999 | De la Huerga | 380/25 |
| 5,978,484 | A | 11/1999 | Apperson et al. | 380/25 |
| 5,999,208 | A * | 12/1999 | McNerney et al. | 348/14.08 |
| 6,003,014 | A | 12/1999 | Lee et al. | 705/13 |
| 6,031,904 | A * | 2/2000 | An et al. | 379/201.02 |
| 6,061,448 | A | 5/2000 | Smith | |
| 6,138,235 | A | 10/2000 | Lipkin et al. | 713/155 |
| 6,144,997 | A | 11/2000 | Lamming et al. | |
| 6,161,139 | A | 12/2000 | Win et al. | |
| 6,212,634 | B1 | 4/2001 | Geer, Jr. et al. | |
| 6,216,116 | B1 | 4/2001 | Barkan et al. | 705/76 |
| 6,256,733 | B1 | 7/2001 | Thakkar | |
| 6,282,183 | B1 | 8/2001 | Harris et al. | |
| 6,285,991 | B1 | 9/2001 | Powar | |
| 6,301,263 | B1 * | 10/2001 | Maggenti | 370/462 |
| 6,343,313 | B1 * | 1/2002 | Salesky et al. | 709/204 |
| 6,343,361 | B1 | 1/2002 | Nendell | |
| 6,347,373 | B1 | 2/2002 | Hoepman | |
| 6,367,009 | B1 | 4/2002 | Davis et al. | |
| 6,393,565 | B1 | 5/2002 | Lockhart et al. | |
| 6,411,605 | B1 * | 6/2002 | Vance et al. | 370/261 |
| 6,430,688 | B1 | 8/2002 | Kohl | |
| 6,438,600 | B1 | 8/2002 | Greenfield et al. | |
| 6,446,253 | B1 | 9/2002 | Mellmer | |
| 6,523,012 | B1 | 2/2003 | Glassman | |
| 6,560,581 | B1 | 5/2003 | Fox | |
| 6,567,075 | B1 * | 5/2003 | Baker et al. | 345/172 |
| 6,577,949 | B1 * | 6/2003 | Robinson et al. | 701/209 |
| 6,601,171 | B1 | 7/2003 | Carter et al. | |
| 6,429,773 | B1 | 8/2003 | Schuyler | |
| 6,624,827 | B1 * | 9/2003 | Hwang et al. | 345/753 |
| 6,651,166 | B1 | 11/2003 | Smith | |
| 6,711,679 | B1 | 3/2004 | Guski et al. | |
| 2001/0025300 | A1 | 9/2001 | Miller et al. | |
| 2001/0053247 | A1 | 12/2001 | Sowinski et al. | |
| 2002/0004831 | A1 | 1/2002 | Woodhill | |
| 2002/0007317 | A1 | 1/2002 | Callagahn et al. | |
| 2002/0016910 | A1 | 2/2002 | Wright et al. | |
| 2002/0032626 | A1 | 3/2002 | DeWolf et al. | |
| 2002/0128903 | A1 | 9/2002 | Kernahan | |
| 2002/0129106 | A1 | 9/2002 | Gutfreund | |
| 2002/0162019 | A1 | 10/2002 | Berry | |
| 2003/0084296 | A1 | 5/2003 | Kyojima et al. | |
| 2004/0049675 | A1 | 3/2004 | Micali | |

OTHER PUBLICATIONS

Herzberg, et al., "Access Control Meets Public Key Infrastructure, or: Assigning Roles to Strangers", pp. 1–13, no date.

Rivest, et al., "SDSI—A Simple Distributed Security Infrastructure", Apr. 30, 1996, pp. 1–37.

C. Ellison, "SPKI Requirements", The Internet Society, Sep. 1999, pp. 1–14.

Ellison, et al., "SPKI Certificate Theory", The Internet Society, Sep. 1999, pp. 1–43.

Muller, "Bluetooth Security Architecture", Bluetooth White Paper, Jul. 15, 1999, pp. 1–33.

Mettala, "Bluetooth Protocol Architecture", Bluetooth White Paper, Sep. 29, 1999, pp. 1–20.

Maywah, "An Implementation of a Secure Web Client Using SPKI/SDSI Certificates", S.B. Massachusetts Institute of Technology, May 2000, pp. 1–76.

Dan Backman, "Smartcards: The Intelligent Way to Security", Network Computing, May 15, 1998, pp. 170–171.

Ellison, http://world.std.com/~cme/, Jul. 21, 2001, pp. 1–3.

IEEE, www.ieee.org, 13 pages, no date.

Infrared Data Association, www.irda.org, 93 pages, no date.

Blaze, et al., "The Keynote Trust–Management System Version 2", Internet Society, Sep. 1999, pp. 1–32.

Gunter, et al, "Policy–Directed Certificate Retrieval", Software–Practice & Experience, Sep. 21, 2000, vol. 30, pp. 1609–1640.

Gunter, et al., "Generalized Certificate Revocation", ACM Symposium On Principles Of Programming Languages, Jan. 2000, pp. 1–14.

Microsoft, Microsoft Computer Dictionary, 1997, Microsoft Press, 3rd Edition, p. 487.

* cited by examiner

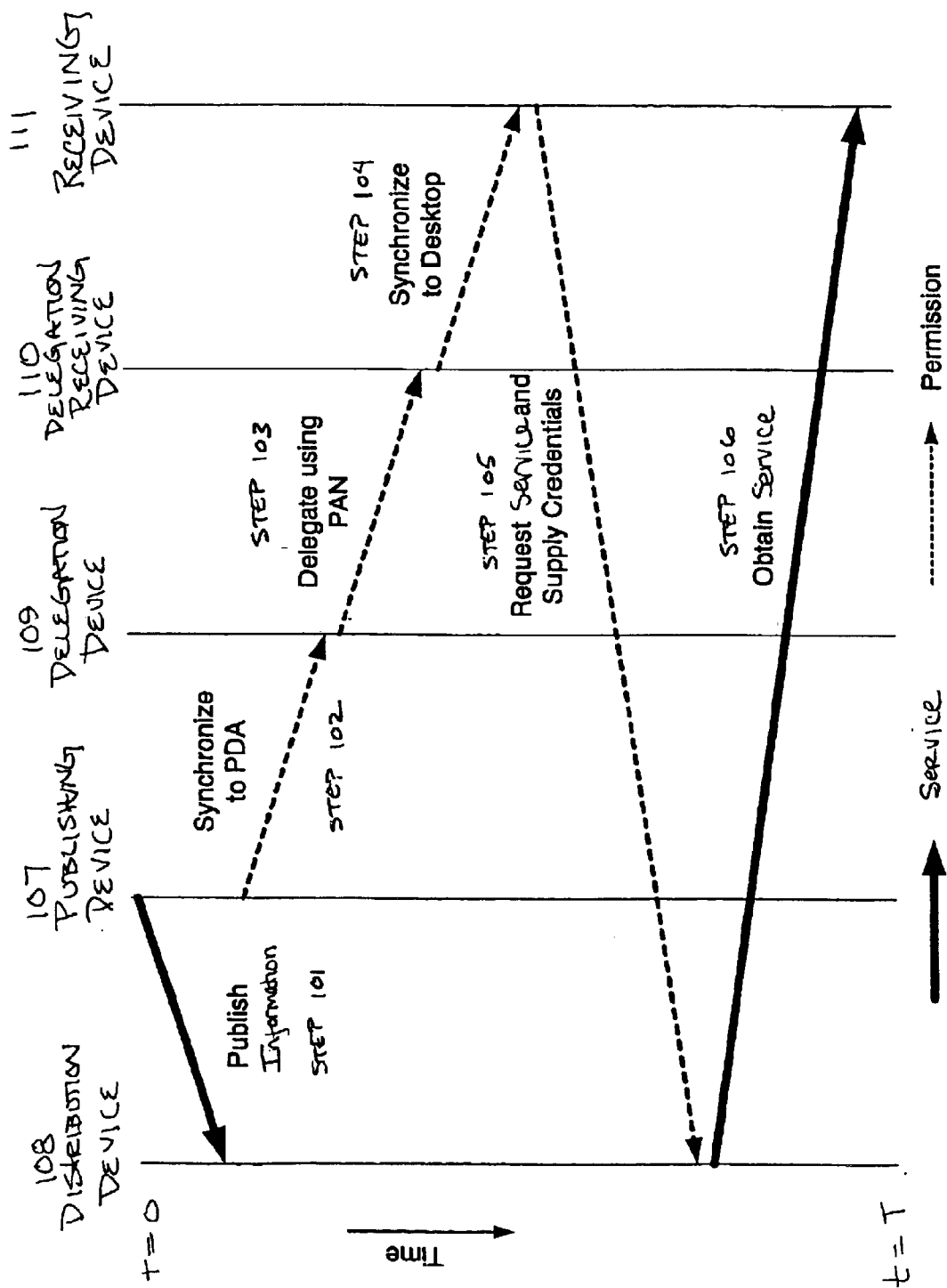

Data Structure Definitions in ASN.1 permissionChain ::= SEQUENCE OF permissionLink permissionLink ::= SEQUENCE {
permissionLinkComponent permissionLinkComponent,
Signature OCTET STRING
} permissionLinkComponent ::= SEQUENCE {
Name OCTET STRING,
Uri OCTET STRING,
Description OCTET STRING,
Note OCTET STRING,
Version INTEGER,
Src_p INTEGER,
Src_q INTEGER,
Src_g INTEGER,
Src_pub INTEGER,
Src_x509cert OCTET STRING,
Src_email OCTET STRING,
Subj_p INTEGER,
Subj_q INTEGER,
Subj_g INTEGER,
Subj_pub INTEGER,
Subj_x509cert OCTET STRING,
Subj_email OCTET STRING,
Delegate BOOLEAN,
Read BOOLEAN,
Write BOOLEAN,
validFrom GeneralizedTime,
validTo GeneralizedTime
}

FIG. 1C

*Sending Permission as part of a header within an HTTP request*
(see http://www.ietf.org/rfc/rfc2616.txt).

```
GET /resource/ HTTP/1.1
Accept: image/gif, image/x-xbitmap, image/jpeg, image/pjpeg,
application/vnd.ms-powerpoint, application/vnd.ms-excel,
application/msword, */*
Accept-Language: en-us
Accept-Encoding: gzip, deflate
User-Agent: Mozilla/4.0 (compatible; MSIE 5.01; Windows NT 5.0)
Vchain: 5OU+F6lolMMJzRmZs6QNRhx1UE3artX4ax56AJdJxYR7dzyPNg1g+cwEOzzjT+
v8ywbpyuugQvjluZSSVDfkbje/C+NV8sLfp5d3eaTykzeP+siJx17wg3njzn2mLOnRKrXw
WuX6gW3gR76zVuIzOy1wS9bZzSiu+ImN/SaHRS3eqBFPL7Ye01Jzin4jH81046kLpiXB+O
CloFRqsCmy5/JCrgvROlRw2rolg6uXgK8xKdybfSXPkJx4w1AOd9GdGAqRycOGFoXtyzpS
+bASvdt2UJMssCXAKTw5bi+sUzuTbeX2xPJwDsPvuevICZHVGwnqJemvVUrH1DdhnMzYzF
ZfTqeZ6sYAZCvsAiCYghRB6fK9JJV/vj9CzFlvfyFPfYYH75ONHjMdDr5qrVbSm4hK2GFZ
IVPnyxYHwTafKHhbU2aQ5KFZbBGMwIikfBRMVfsqz3hpKa5Pd+NZELIwQ4FW1WgrIzL+jw
LelCfDk2V4SntsK+CFxBVGbU6dWpQYe2x0Bjat5yjbgYfXdz/vXfNxjHoAiUYwt4ZNwK0+
UG78+E1rtw2UoIUPuQoCpCXh9EMeaACc7gSKY2KfuY10FeCHZ00c16a4M82DUtE6JhrX6U
fRO8r9QmxVnZu0/MW2vbWNS6rCUvsw78zWpChy3V1lbxTyofETq9WofZ3u+bomL8WgchTd
/QPyHMaky37tXEhrjZxUkgJtIOoA12kVaTDERIwBnhQYM3mzp48n8wCq8qH2JP78DSOQwC
HMolJQPmjfaOxaCR5wE9mhJGHjtTOpXx3GkLN1NuZYq7tbxYznGNJ2VgwUPpCQppohcWmF
B1779OcTc59zt9kV6A3MyeI/1ZCP5iW+VjPEa6h5CWhqHDT3mvDXSAJ8Wx66XiIEJmtzil
1DpntOphJpCDAPyM2XO2bJGrPnimSbUsaELQWdMmtUyczy5TDI1pqjKMNUlyt1HdmN2jly
2+hHplkzgxxXKhilI/JtC97X2GBbm7nlUnICG6sAbxq61BHX5sNslTzWChjYhtFlMuCezT
UmflLBgGPgh6Uv3oyUVoasRmsKi6qbqweDdxXfZD3uFR/iJNLUzwnt3/PJwtPJpJHJ+Sia
/hkB9+alMZXfSkMQaBpAE7/BfzRHs+09fDTL+kBFdOOw0fvkTo9AlfVF99wiAJOhZt7q+e
GWkPi5SRO+9/T710r7wNvC9NELRfsziq/v+8LM179yjjCmOchAZTv09iA8i28gQotzjdFX
1fE3vLOwmrP/61GSfqZhWc2Ho/m7FmqA9pJQVCRsVXXQOSWAZdPC3a75Jxyoa8hHDxgluK
RaAF1xQboHeR1Z9GQHoia9ucQORhrbIu0S2OAfj99QjmszP3gQ64Pw+EakfS+1YQYbauY9
2+8bRf+G8JnhRZIvcyu5y1RW74goguqs6BSf6NcuC3rBJhf30xn151/a8SraFtzUR4rv+e
qjQyE=
Connection: Keep-Alive
Host: www.websitexyz.com
HTTP/1.0 200 OK
Content-Length: 16485
Content-Type: text/html
<html><head><title>WebsiteXYZ</title>
...
```

FIG. 7

Sending the permission as part of a "cookie" within an HTTP request (see http://www.ietf.org/rfc/rfc2616.txt and http://www.ietf.org/rfc/rfc2109.txt).

```
GET /resource/ HTTP/1.1
Accept: image/gif, image/x-xbitmap, image/jpeg, image/pjpeg,
application/vnd.ms-powerpoint, application/vnd.ms-excel,
application/msword, */*
Accept-Language: en-us
Accept-Encoding: gzip, deflate
User-Agent: Mozilla/4.0 (compatible; MSIE 5.01; Windows NT 5.0)
Cookie: Vchain=50U+F6lolMMJzRmZs6QNRhx1UE3artX4ax56AJdJxYR7dzyPNglg+cw
EOzzjT+v8ywbpyuugQvjluZSSVDfkbje/C+NV8sLfp5d3eaTykzeP+siJxl7wg3njzn2mL
OnRKrXwWuX6gW3gR76zVuIzOylwS9bZzSiu+ImN/SaHRS3eqBFPL7Ye01Jzin4jH81046k
LpiXB+OCloFRqsCmy5/JCrgvR01Rw2rolg6uXgK8xKdybfSXPkJx4wlA0d9GdGAqRycOGF
oXtyzpS+bASvdt2UJMssCXAKTw5bi+sUzuTbeX2xPJwDsPvuevICZHVGwnqJemvVUrH1DD
hnMzYzFZfTqeZ6sYAZCvsAiCYghRB6fK9JJV/vj9CzFlvfyFPfYYH750NHjMdDr5qrVbSm
4hK2GFZIVPnyxYHwTafKHhbU2aQ5KFZbBGMwIikfBRMVfsqz3hpKa5Pd+NZELIwQ4FWlWg
rIzL+jwLe1CfDk2V4SntsK+CFxBVGbU6dWpQYe2x0Bjat5yjbgYfXdz/vXfNxjHoAiUYwt
4ZNwK0+UG78+Elrtw2UoIUPuQoCpCXh9EMeaACc7gSKY2KfuY10FeCHZ00cl6a4M82DutE
6JhrX6UfR08r9QmxVnZu0/MW2vbWNS6rCUvsw78zWpChy3V1lbxTyofETq9Wof Z3u+bomL
8WgchTd/QPyHMaky37tXEhrjZxUkgJtI0oAl2kVaTDERIwBnhQYM3mzp48n8wCq8qH2JP7
8DSOQwCHMolJQPmjfaOxaCR5wE9mhJGHjtTOpXx3GkLN1NuZYq7tbxYznGNJ2VgwUPpCQp
pohcWmFB17790cTc59zt9kV6A3MyeI/1ZCP5iW+VjPEa6h5CWhqHDT3mvDXSAJ8Wx66XiI
EJmtzil1DpntOphJpCDAPyM2X02bJGrPnimSbUsaELQWdMmtUyczy5TDIlpqjKMNUlytlH
dmN2jly2+hHplkzqxxXKhilI/JtC97X2GBbm7nlUnICG6sAbxq61BHX5sNs1TzWChjYhtF
lMuCezTUmflLBgGPgh6Uv3oyUVoasRmsKi6qbqweDdxXfZD3uFR/iJNLUzwnt3/PJwtPJp
JHJ+SIa/hkB9+alMZXfSkMQaBpAE7/BfzRHs+09fDTL+kBFdO0w0fvkTo9A1fVF99wiAJ0
hZt7q+eGWkPi5SRO+9/T710r7wNvC9NELRfsziq/v+8LM179yjjCmOchAZTv09iA8i28gQ
otzjdFX1fE3vL0wmrP/6lGSfqZhWc2Ho/m7FmqA9pJQVCRsVXXQOSWAZdPC3a75Jxyoa8h
HDxgluKRaAF1xQboHeRlZ9GQHoia9ucQORhrbIu0S2OAfj99QjmszP3gQ64Pw+EakfS+1Y
QYbauY9Z+8bRf+G8JnhRZIvcyu5ylRW74goguqs6BSf6NcuC3rBJhf30xnl5l/a8SraFtz
UR4rv+eqjQyE=
Connection: Keep-Alive
Host: www.websitexyz.com
HTTP/1.0 200 OK
Content-Length: 16485
Content-Type: text/html
<html><head><title>WebsiteXYZ</title>
...
```

FIG. 8

Sending the permission as part of a URL

```
http://www.websitexyz.com/resource/?Vchain=5OU+F6lolMMJzRmZs6QNRhx1UE3a
rtX4ax56AJdJxYR7dzyPNglg+cwEOzzjT+v8ywbpyuugQvjluZSSVDfkbje/C+NV8sLfp5d
3eaTykzeP+siJxl7wg3njzn2mLOnRKrXwWuX6gW3gR76zVuIzOylwS9bZzSiu+ImN/SaHRS
3eqBFPL7YeOlJzin4jH81046kLpiXB+OCloFRqsCmy5/JCrgvROlRw2rolg6uXgK8xKdybf
SXPkJx4w1A0d9GdGAqRycOGFoXtyzpS+bASvdt2UJMssCXAKTw5bi+sUzuTbeX2xPJwDsPv
uevICZHVGwnqJemvVUrHlDDhnMzYzFZfTqeZ6sYAZCvsAiCYghRB6fK9JJV/vj9CzFlvfyF
PfYYH75ONHjMdDr5qrVbSm4hK2GFZIVPnyxYHwTafKHhbU2aQ5KFZbBGMwIikfBRMVfsqz3
hpKa5Pd+NZELIwQ4FWlWgrIzL+jwLelCfDk2V4SntsK+CFxBVGbU6dWpQYe2xOBjat5yjbg
YfXdz/vXfNxjHoAiUYwt4ZNwK0+UG78+Elrtw2UoIUPuQoCpCXh9EMeaACc7gSKY2KfuY10
FeCHZ00cl6a4M82DUtE6JhrX6UfR08r9QmxVnZu0/MW2vbWNS6rCUvsw78zWpChy3VllbxT
yofETq9WofZ3u+bomL8WgchTd/QPyHMaky37tXEhrjZxUkgJtIOoAl2kVaTDERIwBnhQYM3
mzp48n8wCq8qH2JP78DSOQwCHMolJQPmjfaOxaCR5wE9mhJGHjtTOpXx3GkLNlNuZYq7tbx
YznGNJ2VgwUPpCQppohcWmFB17790cTc59zt9kV6A3MyeI/1ZCP5iW+VjPEa6h5CWhqHDT3
mvDXSAJ8Wx66XiIEJmtzillDpntOphJpCDAPyM2XO2bJGrPnimSbUsaELQWdMmtUyczy5TD
IlpqjKMNUlytlHdmN2jly2+hHplkzgxxXKhilI/JtC97X2GBbm7nlUnICG6sAbxq6lBHX5s
NslTzWChjYhtFlMuCezTUmflLBgGPgh6Uv3oyUVoasRmsKi6qbqweDdxXfZD3uFR/iJNLUz
wnt3/PJwtPJpJHJ+SIa/hkB9+alMZXfSkMQaBpAE7/BfzRHs+O9fDTL+kBFdOOwOfvkTo9A
lfVF99wiAJOhZt7q+eGWkPi5SRO+9/T710r7wNvC9NELRfsziq/v+8LM179yjjCmOchAZTv
09iA8i28gQotzjdFX1fE3vLOwmrP/6lGSfqZhWc2Ho/m7FmqA9pJQVCRsVXXQOSWAZdPC3a
75Jxyoa8hHDxgluKRaAF1xQboHeR1Z9GQHoia9ucQORhrbIu0S2OAfj99QjmszP3gQ64Pw+
EakfS+lYQYbauY9Z+8bRf+G8JnhRZIvcyu5ylRW74goguqs6BSf6NcuC3rBJhf30xnl5l/a
8SraFtzUR4rv+eqjQyE=
```

FIG. 9

METHOD FOR AUTOMATICALLY GENERATING LIST OF MEETING PARTICIPANTS AND DELEGATION PERMISSION

CROSS REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention is directed generally to methods and systems for managing access to services and, more particularly in some embodiments, to methods and systems for managing access to services utilizing a personal area network to ensure security of the services.

2. Description of the Background

The Internet in general, and the World Wide Web in particular, provide an excellent capability for distributing information widely. However, information that needs to be distributed in a controlled manner on the Internet must be placed under an access control system. Such systems require careful management to preserve adequate security. One prior art method for attempting to preserve such security is to protect access through use of passwords. However, passwords are often forgotten or exposed, thereby making management of passwords cumbersome and insecure. Another prior art method for attempting to preserve such security is based on public keys. However, this method assumes a satisfactory (i.e., secure) method for distributing the public keys; to do so over the Internet is cumbersome. Thus, there exists a need for a method and system for preserving adequate security of information to be distributed under these circumstances.

Personal Digital Assistants ("PDAs") are one type of mobile computer that provide small size and weight by accepting constraints on other features. Such limits involve size and quality of display, size and speed of memory, processing speed, longevity and expense of power supply, nature and quality of data entry facilities, and availability and quality of network connectivity. Personal area networking ("PAN") is a family of networking technologies that can be used for wireless communication in the vicinity of an individual carrying a mobile computer with PAN capabilities. Many PDAs currently provide PAN using infrared light.

While PDAs are convenient at meetings for keeping notes, to-do lists, calendar events, and updating contact lists, they are limited in their ability to carry and transmit content and offer other services. A large document may not fit within the memory of a PDA. Available network connectivity may be inadequate to convey the document in a reasonable amount of time. Limits on PDA screen size may make the receiving device unsuitable for viewing the document. Moreover, it is often useful to provide network content distribution device functions more general than document access, and PDAs are inappropriate for providing most services of this kind. Thus, there exists a need for a system that capitalizes on the strengths of PDAs but also accounts for their shortcomings.

BRIEF SUMMARY OF THE INVENTION

The present invention solves the problems encountered by the prior art systems and methods. PDAs or other devices with PAN capabilities provide an avenue of secure distribution of information since they can be used in face-to-face meetings where certain security considerations can be addressed by personal presence. Using such devices and PAN to pass pointers (such as URLs or URIs) to content and services rather than the content and services themselves can address the problems present in the prior art. That is, these devices can be used to pass information at meetings about how to obtain desired content and services on the public Internet or other network. This will even enable content that does not yet exist (meeting minutes, for example) or is changing over time to be adequately communicated at the time of the meeting. The content and services can be obtained by the device itself if its connectivity and viewing capabilities are adequate, or they can be obtained with a more capable system (like a desktop workstation) that gets pointers from the device by docking synchronization or other communication. This approach can simultaneously address security concerns by using PAN to convey access credentials along with pointers to content and services. A method and system for accomplishing this with robust security and modest management overhead will facilitate secure and convenient distribution of sensitive content and services.

The present invention is directed to a method and system of automatically generating a list of participants physically present at a meeting, and distributing permission to the participants. During the meeting, identity and key information is collected from at least one participant using at least one first personal area network. The identity and key information is stored in a delegation device. After the identity and key information is stored, permission to access services is distributed to one or more of the participants over at least one second personal area network using the delegation device. The permission is represented using a digital signature. The first personal area network and the second personal area network may be the same or different. In some aspects of the invention, the delegation device comprises a personal digital assistant. In other aspects of the invention, the permission comprises the authority to delegate one or more further permissions to subsequent delegatees via electronic mail or otherwise. The first and second personal area networks may comprise two or more devices that transmit data by infrared light waves or two or more devices that transmit data by digital short-range radio waves.

The present invention is also directed to a graphical user interface on a delegation device. The graphical user interface includes an access control matrix. The access control matrix includes one or more subject display areas for displaying subject information regarding one or more subjects physically present at a meeting and from whom identity and key information has been collected using at least one first personal area network. The identity and key information is stored on the delegation device. The access control matrix also includes one or more object display areas for displaying object information regarding one or more permissions to access services, for example, related to accessing content or actuating a device, represented by a digital signature. The permissions are distributed to the one or more subjects over at least one second personal area network using the delegation device. The access control matrix further includes one or more association display areas for displaying association information of the one or more subjects to the one or more permissions. In some aspects of the invention, the one or more association display areas comprise one or more access control display areas and, in other aspects of the invention, the one or more association display areas comprise one or more capabilities display areas. The first personal area network and the second personal area network may be the same or different. The delegation device, in some aspects of the invention, comprises a personal digital assistant.

The present invention is further directed to another type of graphical user interface on a delegation device. The graphical user interface includes one or more movable subject icons representing one or more subjects physically present at a meeting and from whom identity and key information has been collected using at least one first personal area network. The identity and key information is stored on the delegation device. The graphical user interface further includes one or more movable object icons relating to one or more permissions to access services, for example, related to accessing content or actuating a device. The permissions, represented by a digital signature, are distributed to the one or more subjects over at least one second personal area network using the delegation device. The subject icons are associated with the object icons by physically associating the two together. The first and second personal area networks may be the same or different.

The present invention solves problems associated with the prior art by providing a method for managing access to services under an access control system while preserving adequate security. Those and other advantages and benefits of the present invention will become apparent from the detailed description of the invention herein below.

BRIEF DESCRIPTION OF THE DRAWINGS

The accompanying drawings, wherein like referenced numerals are employed to designate like parts or steps, are included to provide a further understanding of the invention, are incorporated and constitute a part of this specification, and illustrate embodiments of the invention that together with the description serve to explain the principles of the invention.

In the drawings:

FIG. 1A illustrates a message sequence chart of a preferred embodiment of the present invention.

FIG. 1C illustrates an exemplary data structure for a permission chain.

FIG. 2B illustrates a portion of the system of a preferred embodiment of the present invention.

FIG. 7 illustrates an example of a permission embedded in a header of an http request for a web page.

FIG. 9 illustrates an example of a permission embedded in a URL.

DETAILED DESCRIPTION

Figure 1B:
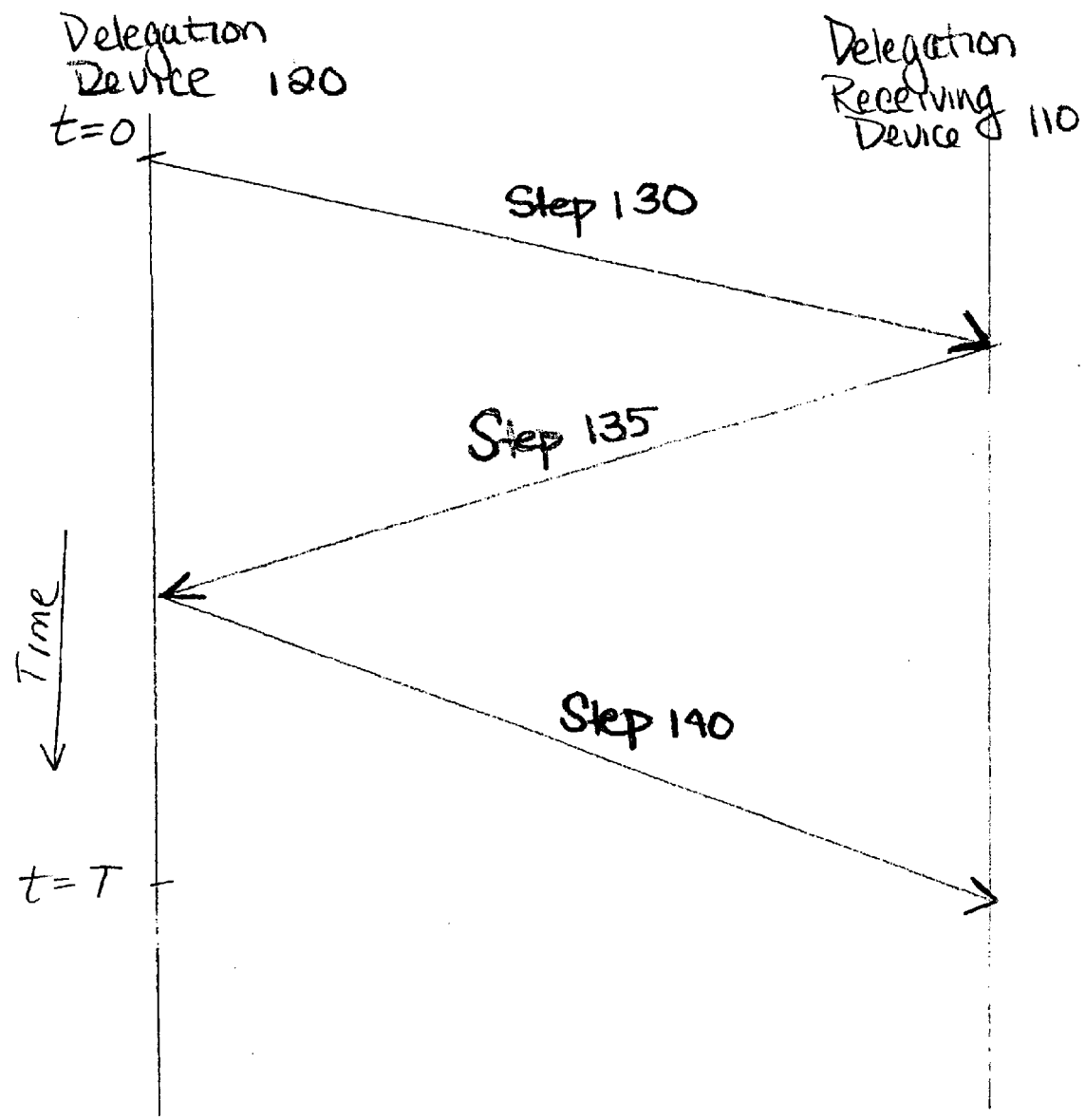
FIG. 1B illustrates a message sequence chart relating to the delegation of a permission in accordance with a preferred embodiment of the present invention.

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements.

Those of ordinary skill in the art will recognize that other elements are desirable and/or required in order to implement the present invention. However, because such elements are well known in the art, and because they do not facilitate a better understanding of the present invention, a discussion of such elements is not provided herein.

The systems and methods disclosed herein relate to managing and controlling access to services. Such services may involve the delivery of content (referring broadly to any object, data, documents, files, directories, text, software, computer applications or other information). In addition, and by way of example, such services may involve actuating a device that, for example, turns on an engine or opens a lock. The services may be requested directly or indirectly through use of, for example, a mobile computer such as a PDA.

FIG. 1A depicts a message sequence chart that provides an overview of the sequence of steps for managing access to a service in accordance with one embodiment of the present invention. In step 101, an object or other information relating to the service is transferred through use of publishing device 107 (such as, for example, a personal computer) to distribution device 108 (for example, a computer server such as a web server). This step may be performed by, in one example, the delegator or someone associated with the delegator. Distribution device 108 is connected to publishing device 107 via a computer network, such as a local area network ("LAN"), a wide area network ("WAN"), or the Internet.

In step 102, publishing device 107 and delegation device 109 (such as a PDA) are synchronized, which includes the transfer of data relating to the service from publishing device 107 to delegation device 109. Such data may be a resource, such as a file or directory name or URL that provides the location of the service or information relating to the service on distribution device 108.

In step 103, a delegator delegates, using delegation device 109, a permission to a delegatee, using delegation receiving device 110. In the preferred embodiment, the permission provides the delegatee with authority to access the service and/or to delegate additional permissions to one or more subsequent delegatees. In the preferred embodiment, the delegation of the permission occurs over an ad hoc network in a personal area network (typically, though not necessarily, within one room) while physical presence exists between the delegator and the delegatee. An ad hoc network refers to any network that is formed by two or more mobile computers that come into contact with each other. Such a network is formed without use of a base station and without a preconfigured infrastructure. For example, one or more delegators may attend a meeting with one or more potential delegatees at which each individual is physically present. Each delegator will have a delegation device, such as a PDA, and each delegates involved in the exchange will have a delegation receiving device, such as a PDA or lap top computer. Verification of each delegates is performed by virtue of such delegatee's physical presence within the personal area network.

In step 104, delegation receiving device 110 is, in some embodiments, synchronized with receiving device 111. In this step, data representing the permission delegated to the delegatee in step 103 on delegation receiving device 110 is synchronized with data on receiving device 111.

In step 105, receiving device 111, such as a personal computer, makes a request, electronically via a computer network (different from the personal area network referred to with reference to step 103), to distribution device 108 (which has stored and/or has access to the service or information relating to the service placed by publishing device 107 in step 101), to view and/or access the service or related information. The request may include data representing the identity/location of the service or information relating to the service (such as a file or directory name or URL), credential information, including the identity and public key information of the requestor (used for authentication), and the nature and extent of the permission delegated (used for authorization). The credential information may be supported using secure socket layer ("SSL") protocol. Distribution device 108 reviews the request, including the credential information, and determines whether the requestor is entitled to access the service. Access will be provided if, in one example, it is determined that the requester has the private key required to access the service.

If distribution device 108 determines that the requester is entitled to access the service, in step 106, the distribution device 108 provides the receiving device 111 with access to the service over a computer network (in one embodiment different from the personal area network referred to in step 103).

Figure 2A:
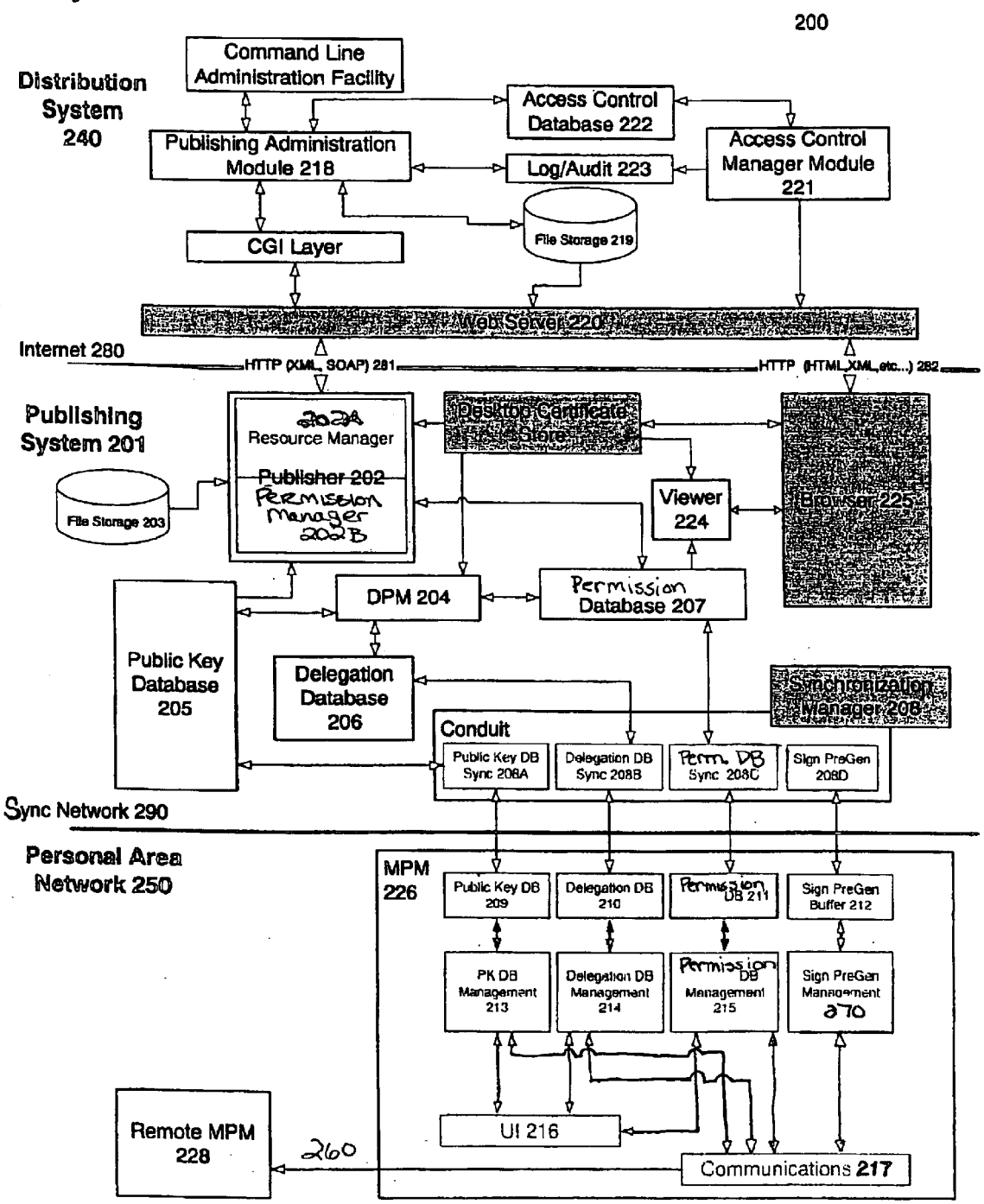
FIG. 2A illustrates a system of one embodiment of the present invention.

FIG. 2A provides an overview of the system of a preferred embodiment of the present invention. The system 200 includes publishing system 201. In the preferred embodiment, publishing system 201 comprises one computer but may, in some embodiments, comprise more than one computer. Publishing system 201 includes, for example, publishing device 107 in FIG. 1A. System 200 also includes distribution system 240, which in some embodiments comprises one computer and in other embodiments comprises more than one computer. Distribution system 240 includes, for example, distribution device 108 in FIG. 1A. The publishing system 201 includes database 203, for storing information relating to the service to be transferred to web server 220 using, for example, publisher 202. Publisher 202 may be used to select resources (e.g., names of files or directories or URLs associated with service) that the user may want to delegate. The selected resources may be stored in permission database 207. Permissions previously delegated to the user may also be available for selection and storage in permission database 207. Thus, publisher 202, includes resource manager 202A, which interfaces with web server 220, and permission manager 202B, which interfaces with permission database 207.

Distribution system 240 includes administrative server 218, which, in some embodiments, performs systems administration functions, such as allowing users to open accounts; revoking permissions if, for example, a key is compromised; and allowing a systems administrator to review logs.

Also included in distribution system 240 is distribution database 219. Information relating to the service, which is published via publishing system 201 and stored in database 203, may also be transmitted to distribution system 240 via publishing link 281 to web server 220 and stored in distribution database 219. This activity corresponds to step 101 shown in FIG. 1A. In some embodiments, web server 220 is not a server accessible over the Internet but is, instead, accessible over a LAN or an intranet. Distribution system 240 also includes access control server 221, which controls access to the service. Access control server 221 accesses access control database 222 to determine whether to provide access to the service by checking the validity of the delegation chain, as discussed in more detail with reference to FIGS. 1C and 1D below. Access control server 221 is coupled with log/audit server 223, which creates and stores a record of access activity.

With further reference to FIG. 2A, publishing system 201 includes desktop permission manager 204, public key database 205, delegation database 206 and permission database 207, which electronically manage data representing credential information relating to permissions. In particular, desktop permission manager 204 allows permissions to be delegated via electronic mail from publishing system 201. Public key database 205 holds information relating to public keys and permission database 207 holds information relating to permissions or chains of permissions. Delegation database 206 holds miscellaneous information such as working data (i.e., intermediate computations) and log information.

Publishing system 201 also includes synchronization manager 208, which allows for synchronization of certain data related to public keys, delegations, permissions and pregenerated data (to be used in connection with creating an electronic signature). Synchronization manager 208 includes public key database synchronization module 208A, delegation database synchronization module 208B, permission database synchronization module 208C and signature pregenerator module 208D. Synchronization manager 208 electronically synchronizes, by way of synchronization network 290, public key database 205, delegation database 206, and permission database 207 of the publishing system 201 with public key database 209, delegation database 210, and permission database 211, of mobile permissions manager 226, respectively. Synchronization network 290 may, in some embodiments, be created by placing mobile permissions manager 226 (such as a PDA) in a docking cradle that is connected electronically to publishing system 201 (such as a personal computer). With reference to FIG. 1A, such synchronization occurs in step 102 (with respect to synchronization between publishing device 107 and delegation device 109) and in step 104 (with respect to synchronization between delegation receiving device 110 and receiving device 111). In some embodiments, synchronization causes data stored in public key database 209, delegation database 210, and permission database 211 of mobile permissions manager 226 to be identical to corresponding data stored in public key database 205, delegation database 206, and permission database 207 of publishing system 201. Pregenerated data manager 270 may be filled by signature pregenerator module 208D as part of the synchronization process.

Mobile permissions manager 226 further comprises public key database manager 213, delegation database manager 214, permission database manager 215 and pregenerated data manager 270, each of which manage portions of the data representing credential information relating to permissions. In particular, each manager interfaces to manage its respective database when an operation must be performed with respect to each such database. Public key database manager 213, delegation database manager 214, permission database manager 215 and pregenerated data manager 270 of mobile permissions manager 226 are coupled to communications mechanism 217, which allows the user to receive output from another delegation device (such as remote device 228) and provide input to other delegation receiving devices (such as remote device 228). Communications mechanism 217 is a digital data interface (for example, an infrared port or other antenna) that allows for wireless electronic communication with other delegation devices. In addition, public key database manager 213, delegation database manager 214, and permission database manager 215 are coupled to user interface 216, which allow a user to view and control certain activities occurring within mobile permissions manager 226. Pregenerated data manager 270 may, in some embodiments, be coupled to user interface 216.

Thus, a delegator who wishes to delegate a permission may do so by way of system 200. The delegator may define who may access the services at publisher 202; this may be, in an exemplary embodiment, a specific individual or any individual that requests access and has the specified private key corresponding to the appropriate public key. Information relating to the service is transferred by way of publisher 202 via publishing link 281 and stored at web server 220 (corresponding to step 101 of FIG. 1A). Data representing the resource corresponding to this service (i.e., its name or a URL or URI associated with it) is transferred by publisher 202 to permission database 207 and is synchronized to permission database 211 by permission database synchronization module 208C (corresponding to step 102 of FIG. 1A). Permission database manager 215 may then obtain the data representing the resource from permission database 211, which is then ready for use in delegating a permission to remote device 228, as described with reference to FIG. 1B.

FIG. 1B is a message sequence chart of one embodiment of the present invention that provides more detail of step 103 shown in FIG. 1A. In particular, FIG. 1B describes one manner in which a permission is delegated by mobile permissions manager 226 to remote device 228 by way of delegation link 260 within personal area network 250. The delegator selects the resource he or she is interested in delegating to the delegator by way of user interface 216. In step 130, delegation device 109 electronically queries delegation receiving device 110 for its public key. In step 135, delegation receiving device 110 provides its public key. With reference to FIG. 2A, focusing on the role of the delegator as mobile permissions manager 226, the public key is received from remote device 228 over communications mechanism 217 on mobile permissions manager 226. The delegator then uses its own private key, together with data in the pregenerated data buffer 212 to create a digital signature indicating that the key of the delegatee should receive access to the selected resource. In step 140, the permission, (represented by the digital signature and including the resource data) is transmitted electronically to delegation receiving device 110 (with reference to FIG. 2A, via communications mechanism 217 to remote device 228). In one embodiment of the system, this permission can have a form similar to ones defined in IETF RFC 2693, Simple Public Key Infrastructure Certificate Theory.

While the embodiment described with reference to FIG. 1B describes a digital signature being created through use of public/private key encryption techniques, other methods of creating a digital signature are within the scope of the present invention.

Figure 1D:
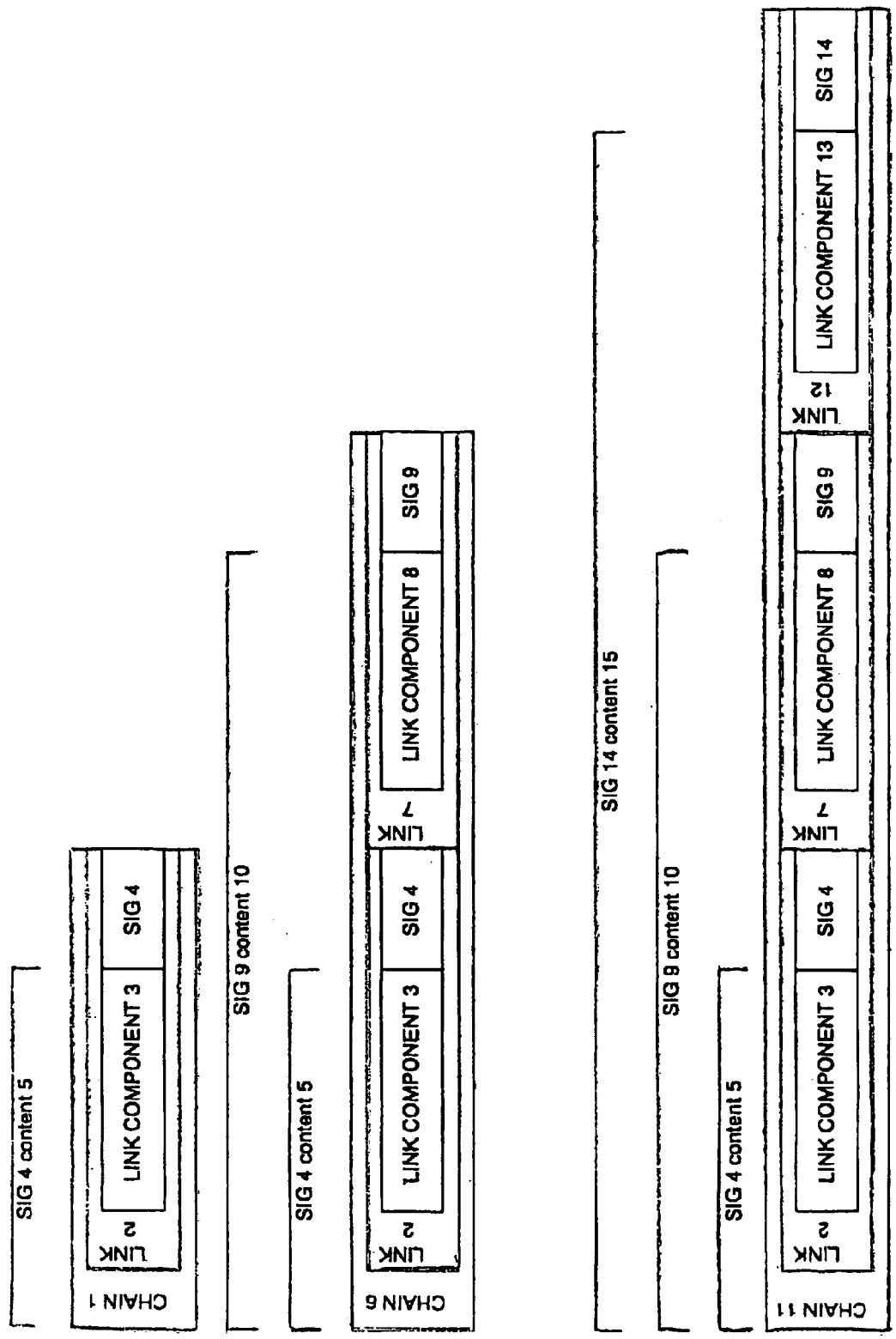
FIG. 1D illustrates a series of exemplary permission chains.

FIGS. 1C and 1D show an exemplary data structure and a series of exemplary permission chains, respectively, that may be used in accordance with one embodiment of the present invention. A permission chain is a sequence of permission links, each of which consist of a permission link component and a signature. The permission link component contains data that describes the permission, including the delegatee, the delegator, terms of the permission such as time limits, and other optional information. Each time a permission is delegated, the delegator constructs a new permission link and appends it to the permission chain. The signature cryptographically binds the identity of delegator to the existing permission chain and to the data in the new permission link component.

In a typical implementation, the permission chain is represented as an ASN.1 ("Abstract Syntax Notation One") sequence and encoded as an octet string using DER ("Data Encoding Rules") as shown in FIG. 1C. Each signature in a permission chain is computed using the NIST ("National Institute for Standards and Technology") DSS ("Digital Signature Standard") and is represented as a DER-encoded octet string of two ASN.1 integers (known as "r" and "s" in the DSS).

With reference to FIG. 1D, in order to construct permission chain 1 intended for delegation to a first delegatee, a first delegator encodes the appropriate permission in permission link component 3, and creates Signature 4 by signing content represented by DER octet string 5, which is the string from the beginning of permission chain 1 through the end of permission link component 3. Permission link component 3 must, in some embodiments, minimally consist of the public keys of the first delegatee and the first delegator, the URI or URL of the resource in question, and the boolean flags as indicated in the permission link component definition.

To construct permission chain 6 intended for delegation to a second delegatee, the first delegatee, now the second delegator, encodes the appropriate permission in permission link component 8, and creates Signature 9 by signing content represented by DER octet string 10, which is the string from permission chain 1 through permission link component 8. Permission link component 8 must minimally consist of the public key of the second delegatee. Other data in permission link component 8 is optional but must represent the same or less permission as presented in the previous chain, permission link component 3.

The second delegatee, now the third delegator, uses the same technique to construct permission chain 11 for delegation to the third delegatee.

To gain access to a resource identified in permission link components 13, 8, and 3, the third delegatee must present permission chain 11 to the appropriate authority and prove to the authority that he or she holds the private key that corresponds to the public key indicated in permission link component 13. The authority must also validate the authenticity of permission chain 11 before granting access to the resource.

To validate the authenticity of permission chain 11, the authority must verify signatures 4, 9, and 14 against content 5, 10, and 15, respectively. The verification process will determine if the private key corresponding to an appropriate public key was used to sign the content in question. The appropriate public key for a signature is the delegatee (subject) public key indicated in the previous permission link component. If there is no previous permission link component, then the appropriate public key is the delegator (source) public key indicated in the current permission link component. Therefore, the appropriate public key for signature 14 is the subject public key in permission link component 8. For signature 9, it is the subject public key in permission link component 3. For signature 4, it is the source public key in permission link component 3.

Next, the authority must verify that the permission data (such as the URL or URI, delegatee, read, write, and time range) presented in each permission link component represents the same or less permission as such presented in the previous permission link component. For example, in a typical implementation, if the URL in permission link component 3 is http://company.com/resource, and the URL in permission link component 8 is http://company.com/resource/subresource then the authority will determine that the URL in permission link component 8 represents less permission than the URL in permission link component 3, since access to http://company.com/resource implies access to http://company.com/resource/subresource. The rules defining implied access may vary in other embodiments of the invention.

Finally, the authority must verify that the delegator (source) public key indicated in the permission link component 3 has permission to delegate access to the resource identified by permission chain 11. This permission information is typically accessible to the authority via means other than the permission chain itself. For example, the source public key may be listed in an ACL ("Access Control List") in a database accessible to the authority.

Given that the creation of a digital signature requires calculation of parameters that are the result of modular arithmetic and exponentiation of very large numbers, in some embodiments, the delegator may wish to pregenerate certain data relating to the digital signature, rather than generating such data on the mobile permissions manager 226 at the time the delegator seeks to delegate the permission. Generating such data on the mobile permissions manager 226 may be time consuming given that it is a constrained device (i.e., slow speed, little memory etc.). Such activities can be performed more efficiently on, for example, a personal computer. These pregenerated values represent at least a portion of data required to create a digital signature. They typically consist of the values referred to as "r", "k", and the "$k^{-1}$", in the DSA standard, FIPS 186-2, Section 4, and can be generated as described in FIPS 186-2, Appendix 3.2. Multiple sets of these parameters, one set per digital signature, can be generated by the signature pregenerator module 208D during synchronization with the mobile permissions manager 226, without prior knowledge of the service to which a signature will eventually be applied. The data does not need to be stored in synchronization manager 208 except in a temporary buffer during the brief time period after generation and before synchronization. Data representing the pregenerated values can be synchronized by way of signature pregenerator module 208D of synchronization manager 208 with mobile permissions manager 226 and stored in pregenerated data buffer 212. Then, upon the performance of a DSA signature operation on mobile permissions manager 226 using pregenerated data manager 270, the digital signature can be completed and the permission delegated.

Remote device 228, on which the permission has been stored, may then be used to gain access to the service. This similarly can be shown with reference to FIG. 2A and, in doing so, remote device 228 shall be referred to as mobile permissions manager 226.

Thus, a device, such as mobile permissions manager 226, on which a permission has been stored, for example in permission database 211, can be used in connection with accessing services. Mobile permissions manager 226 is synchronized with publishing system 201 (for example, a personal computer) such that data representing the permission in permission database 211 can be synchronized with data stored in permission database 207 by permission database synchronization module 208C (corresponding to step 104 in FIG. 1A).

Once synchronized, viewer 224 of publishing system 201 can be used to make a request (electronically) by way of browser 225 to access the service (corresponding to step 105 in FIG. 1A). Viewer 224 may comprise a plug in or helper object on browser 225 that allows a user to view web pages. Viewer 224 also supplies credential information (including permission to access the service), for example, as a header of an http request for a web page associated with a URL supplied to the browser. In alternative embodiments, the credential information is supplied by the viewer in a cookie within an http request or, in still other embodiments, as part of the URL. Other suitable alternatives are likewise within the scope of the present invention. The request is transmitted over request link 282 and received at web server 220 of distribution system 240. The request is then transmitted by web server 220 to access control server 221. Access control server 221 queries access control database 222 to determine whether the permission is acceptable. If the permission is acceptable, distribution system 240 will allow browser 225 to access the service (corresponding to step 106 in FIG. 1A). If the permission is not acceptable, distribution device 202 will not allow browser 225 to access to the service.

In some embodiments, in addition to or in lieu of seeking to obtain access to the service, the delegatee delegates permission obtained from the delegator to a subsequent delegatee. This may be accomplished using PAN or, in alternative embodiments, may be accomplished by sending the permission via electronic mail using desktop permission manager 204.

In one example in which the present invention may be utilized, the delegator may attend a meeting with individuals to whom the delegator wishes to provide access to a service. For example, the delegator may have created confidential documents related to a business transaction. Alternatively, the delegator may be in charge of assembling particular documents relating to a business transaction. In this alternative scenario, the delegator has not necessarily created the content himself or herself but, instead, has permission to access content created by others. Upon physically meeting with associates involved in the business transaction, the delegator may wish to allow the associates to have access to such documents. In this example, each of the meeting participants participating in the exchange has a device capable of creating a PAN, such as a PDA. The delegation device may be any device, such as a mobile computer, that is capable of creating an ad hoc network with another device and that has the ability to control delegation, including delegating electronic permissions. Thus, for example, a cellular telephone that has PAN capabilities could serve as a delegation device or a delegation receiving device.

Figure 3B:
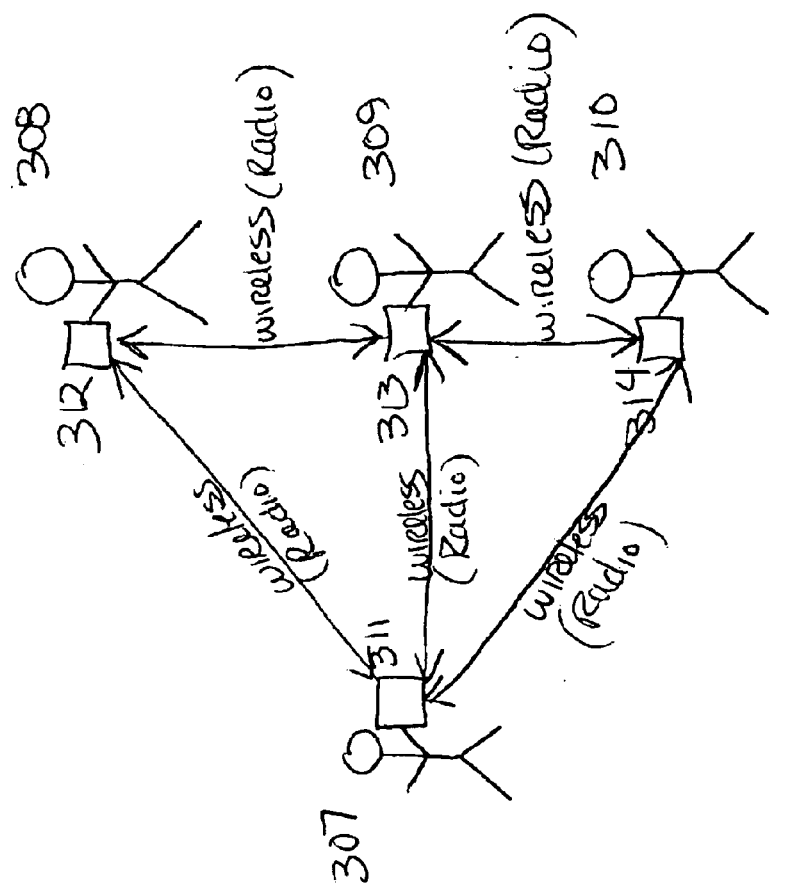
FIG. 3B illustrates an example of an alternative personal area network.
Figure 3A:
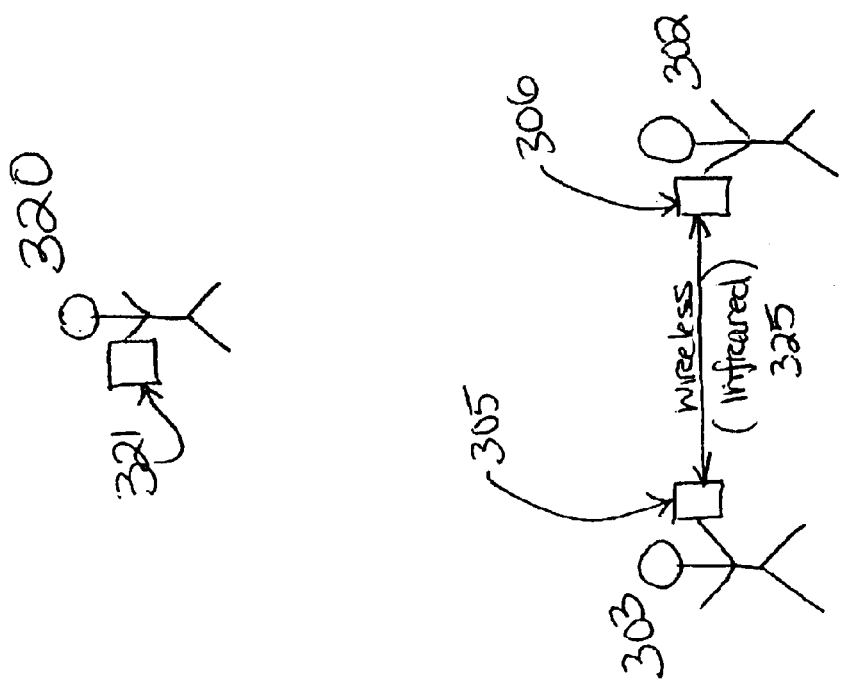
FIG. 3A illustrates an example of a personal area network.

As shown with reference to FIGS. 3A and 3B, one or more PANs may serve to communicate the delegations. With reference to FIG. 3A, delegator 303 and delegates 302 each have a PDA, delegating device 305 and delegation receiving device 306, respectively. In this example, data is transferred between delegating device 305 and delegation receiving device 306 by infrared light waves and the PAN is created by physically pointing these devices toward each other. An ad hoc network is created within the PAN. If delegator 303 were to want to create a PAN with delegatee 320 (having delegation receiving device 321), delegator 303 would have to tear down the PAN created with delegatee 302 and physically point delegation device 305 at delegation receiving device 321. Thus, in the scenario described with reference to FIG. 3A, several digital networks may exist over a period of time.

With reference to FIG. 3B, delegator 307 and delegatees 308, 309 and 310 each have a PDA, delegation device 311 and delegation receiving devices 312, 313 and 314, respectively. In this example, data is transferred among delegation device 311 and delegation receiving devices 312, 313 and 314 by short-range radio waves (e.g., Bluetooth or wireless LAN technology). Each of delegation device 305, and delegation receiving devices 312, 313 and 314 (all within range of one another) are capable of forming one PAN and communicating with each other simultaneously. Thus, for example, there would be no need for delegator 307 to tear down a PAN with delegatee 308 to establish a PAN with delegatee 309.

FIGS. 3A and 3B describe only two scenarios in which PANs may be created. One skilled in the art will recognize that many variations of PANs could be created using different types of technology, all of which are within the scope of the present invention. Thus, by way of example and not limitation, the transmission of data may be by infrared light waves, short-range radio waves or any other means in which one or more PANs are created.

Thus, with reference to FIG. 3A, identity and key information is obtained by delegation device 305 from delegation receiving device 306. Then, one or more permissions relating the service may be delegated from delegation device 305 to delegation receiving device 306 over wireless link 325. The permission may be permission to access the service, with or without a time duration, and/or may include permission to delegate one or more further permissions to one or more subsequent delegatees (via e-mail or otherwise), with or without a time duration. If delegator 303 were to want to delegate a permission to delegatee 320, delegator 303 would have to create a new PAN with delegatee 320, through their respective devices, in order to accomplish this.

In some embodiments, the delegator verifies the identity and key information through physical presence of the delegatee and, in addition, may do so through a third party verification service, such as VeriSign. In other embodiments, physical presence of the delegates is the only verification method. In an alternate embodiment, key information is received from a delegatee over a computer network. A hash of the key is taken and the hash is verbally confirmed with the delegatee to ensure that the key has been correctly delivered to the delegator from the delegatee. Permission to access the service is delegated by a delegator to the delegatee, wherein the permission is represented using a digital signature. After that, the delegatee is provided access to the service.

Figure 4:
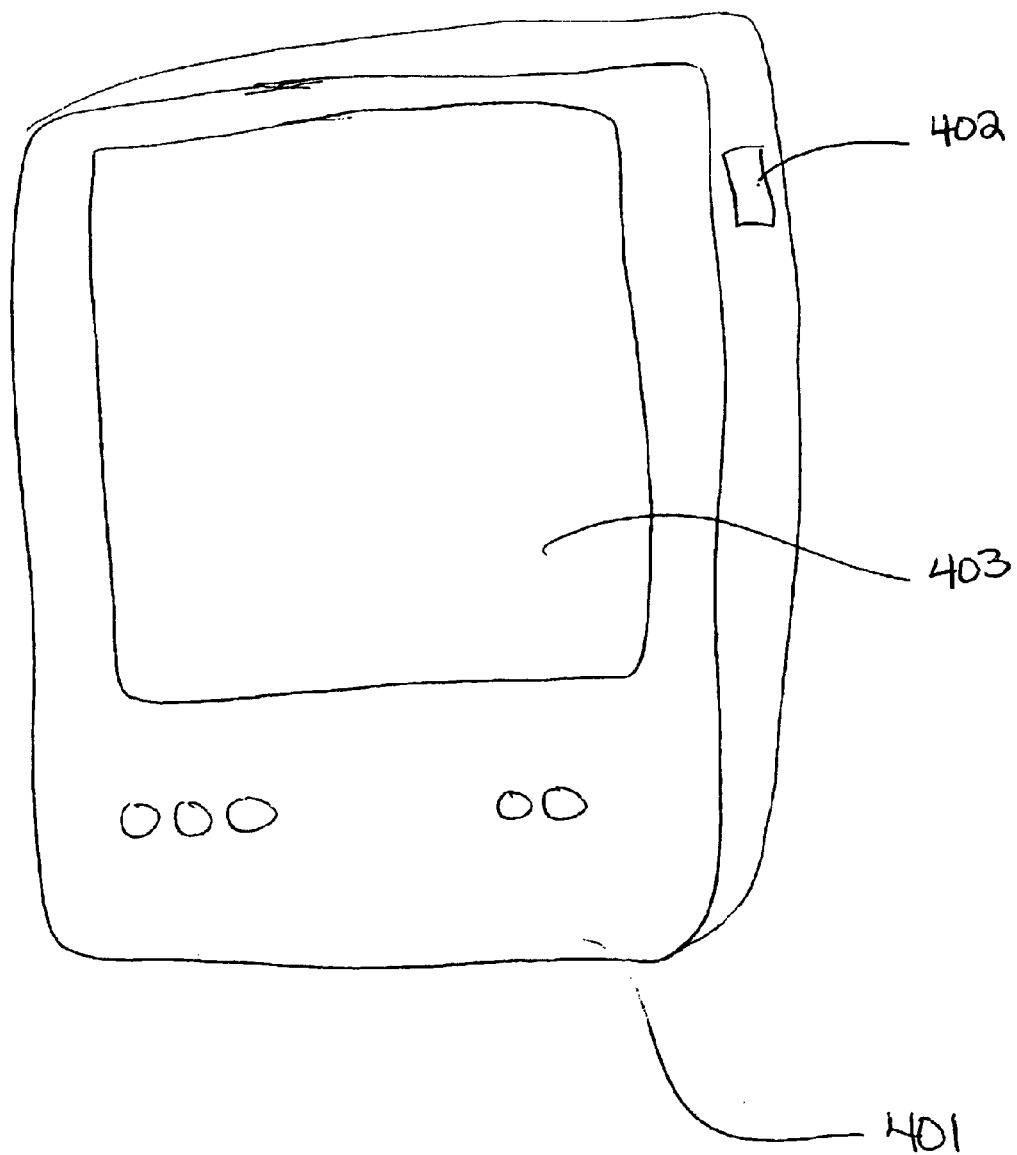
FIG. 4 illustrates an example of a PDA.

FIG. 4 shows an exemplary delegation device 401 (in this case, a PDA) through which a permission may be transmitted to, for example, another PDA or lap top computer via infrared light waves over IR port 402. Delegation device 401 includes a graphical user interface ("GUI") 403 (corresponding to user interface 216 in FIG. 2A).

Delegation device 401 may, in some embodiments, include a receiver that is capable of processing global positioning system ("GPS") signals. In this embodiment, data relating to the location of the delegation device (identified by the GPS receiver) at the time the permission is delegated to the delegatee may be bound to the permission in the manner described, for example, with reference to FIG. 1D.

An exemplary embodiment of portion of a system that includes this functionality is shown with reference to FIG. 2B. FIG. 2B shows remote device 228 and mobile permissions manager 226, in communication via delegation link 260, as shown in FIG. 2A. In addition to public key database 209, permission database 211, pregenerated data buffer 212, public key database manager 213, permission database manager 215, and pregenerated data manager 270 (not shown in FIG. 2B for purposes of clarity), and delegation database 210 and delegation database manager 214 (shown in FIG. 2B), the mobile permissions manager contains GPS buffer 265 and GPS receiver 266. GPS receiver 266 periodically receives signals from GPS sender 267 (which is, in one embodiment, one or more satellites) indicating the location of GPS receiver 266 and, thus, the location of mobile permissions manager 226. Data representing the location of mobile permissions manager 226 is stored in GPS buffer 265. Upon creating a permission to be delegated, delegation database manager 214 consults GPS buffer 265 to obtain data representing the most recent location information obtained by GPS receiver 266 from GPS sender 267. This data representing the location information is bound to the permission delegated. In the instance in which the permission is delegated outdoors, the most recent location information may be the location of the permission at the time GPS buffer 265 is consulted. However, if the delegation is performed within a building, the most recent location information may be the location of mobile permissions manager 226 prior to the time it entered the building.

The embodiment of the present invention in which mobile permissions manager 226 includes GPS functionality has many advantages. One advantage of this embodiment is that the delegator may control access to services based on the location at which the permission was delegated. By way of example, the delegator may revoke one or more permissions delegated at a particular location. Another advantage is that delegation information may be monitored based on the location at which the permission was delegated. For example, for marketing purposes, a delegator may want to determine the locations at which permissions are being delegated. In another example, a delegator may want to determine the locations at which certain permissions were delegated to determine whether such delegations comply with certain legal restrictions or requirements.

In one particularly advantageous embodiment of the present invention, a list of participants physically present at a meeting may be generated, and permission distributed to the participants, automatically. For example, with reference to FIG. 3A, during the meeting, identity and key information is collected by delegator 303 from delegatee 302 using the PAN created by delegation device 305 and delegation receiving device 306. Subsequently, delegator 303 may create a PAN with delegatee 320 using delegation device 305 and delegation receiving device 321 and collect identity and key information. In an alternate embodiment, with reference to FIG. 3B, delegator 307 collects identity and key information from each of the delegatees 308, 309 and 310 over the PAN created by delegation device 311 and delegation receiving devices 312, 313 and 314. Thus, delegation device 305 (with reference to FIG. 3A) and delegation device 311 (with reference to FIG. 3B) serve as a collection device for collecting identity and key information. Any device capable of creating a PAN and controlling delegation of permissions may be used in accordance with the present invention. The collection device may then generate a list of participants present at the meeting (including their identity and key information) and distribute it to each participant. The collection device may then create one or more permissions and distribute such permissions to one or more of the participants. The collection/distribution device 305 and 311 may also have a GUI for displaying the interfaces as described with reference to FIGS. 5 and 6 below.

There are various ways to identify permissions to be delegated to various delegatees and permissions previously delegated to delegatees during a meeting such as that described with reference to FIGS. 3A and 3B. For example, in one embodiment of the present invention, the delegation device, such as that shown with reference to FIG. 4, includes GUI 403.

Figure 5:
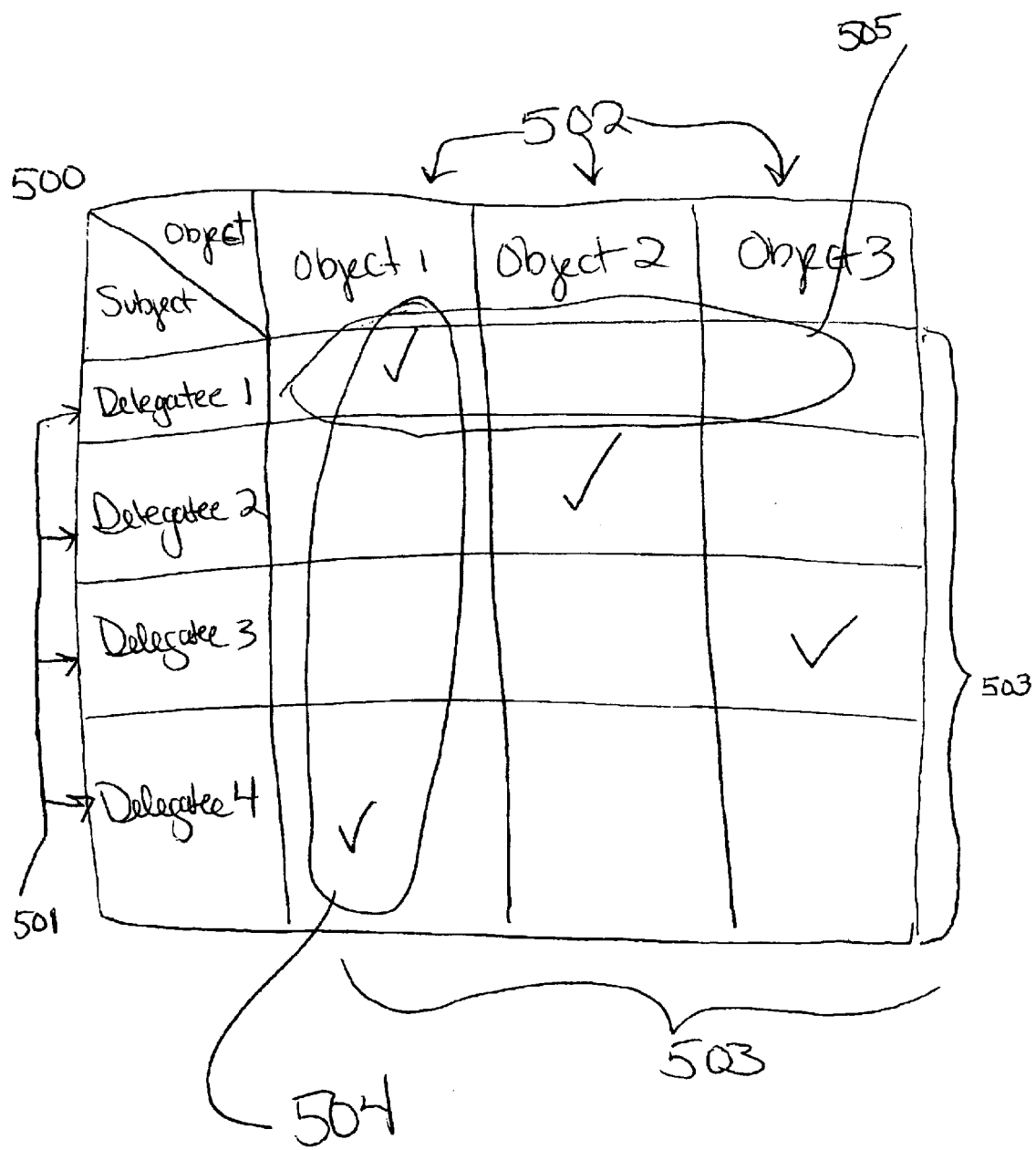
FIG. 5 illustrates an example of an access control matrix displayed on a graphical user interface of a delegation device used in accordance with one embodiment of the present invention.

GUI 403 may be capable of displaying an access control matrix, such as that shown with reference to FIG. 5. Access control matrix 500 includes one or more subject areas 501 for displaying delegatee information regarding one or more delegatees physically present at a meeting and from whom identity and key information has been collected using one or more personal area networks, as discussed with reference to FIGS. 3A and 3B. The identity and key information may be stored on the delegator's delegation device. Access control matrix 500 further includes object display areas 502 for displaying object information. The object information relates to one or more permissions that have been or will be delegated to one or more delegatees over one or more personal area networks using the delegation device. Thus, the object information may be a resource, such as a name of a file or directory or a URL or URI. The object may also be a permission previously delegated to the delegator, which the delegator may then delegate to another. Access control matrix 500 further includes one or more association display areas 503 for displaying association information. The association information includes the manner in which one or more of the subjects are associated with one or more of the objects. Association display areas 503 may, in some embodiments, comprise access control display areas 504 and/or capabilities display areas 505. Thus, in the example shown with reference to FIG. 5, delegatees 1 and 4 are to be given permission pertaining to object 1; delegatee 2 is to be given permission pertaining to object 2; and delegatee 3 is to be given permission pertaining to object 1.

Figure 6:
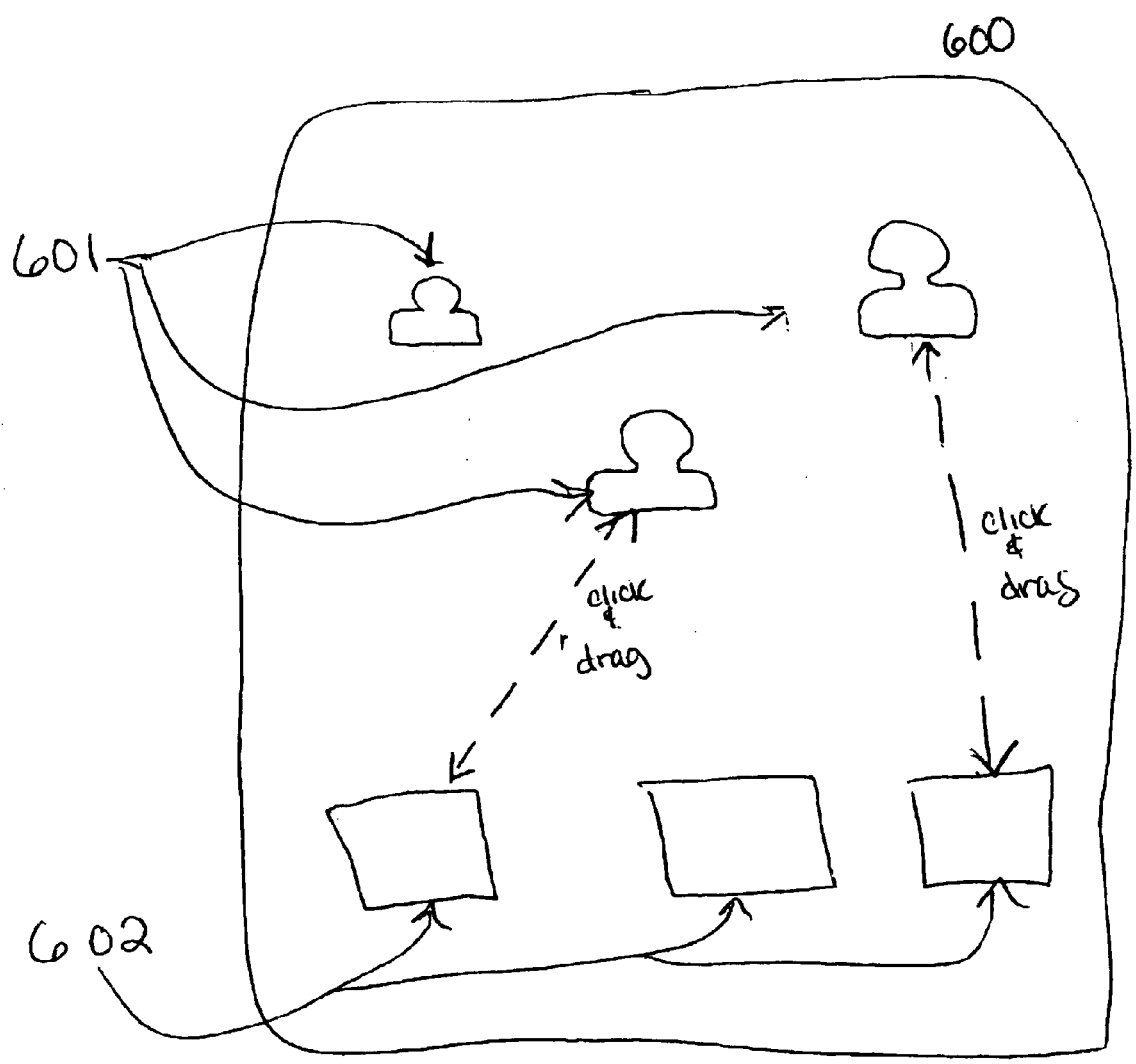
FIG. 6 illustrates an example of a graphical user interface of a delegation device using movable icons to assist in delegation of permissions, in accordance with one embodiment of the present invention.

With reference to FIG. 6, in an alternative embodiment, interface 600 of delegation device (such as GUI 403 shown with reference to FIG. 4) includes one or more movable subject icons 601, which represent one or more delegatees physically present at a meeting and from whom identity and key information has been obtained and stored in the delegation device. In addition, interface 600 contains one or more movable object icons 602, which represent one or more permissions to access services. Each object (represented by an object icon 602) is associated with a particular delegatee (represented by a subject icon 601) by physically associating the particular object icon 602 with the particular subject icon 601. This may be accomplished, in one exemplary embodiment, by clicking on a subject icon 601 and dragging it to an object icon 602. After an object icon 602 is associated with a particular subject icon 601, in the preferred embodiment, both the object icon 602 and the subject icon 601 remain, thereby subsequently allowing the particular object icon 602 to be associated with other subject icons 601 and vice versa. Other manners of physically associating the icons will be known to those skilled in the art and are within the scope of the present invention.

In the preferred embodiment, once a delegatee has obtained permission and the permission has been stored on, for example, the delegatee's PDA, the delegatee may synchronize its PDA with its personal computer, thereby transmitting data representing the permissions to the personal computer, as described above with reference to FIG. 2A. A request can then be made to access the service via the personal computer over a computer network.

Figure 8B:
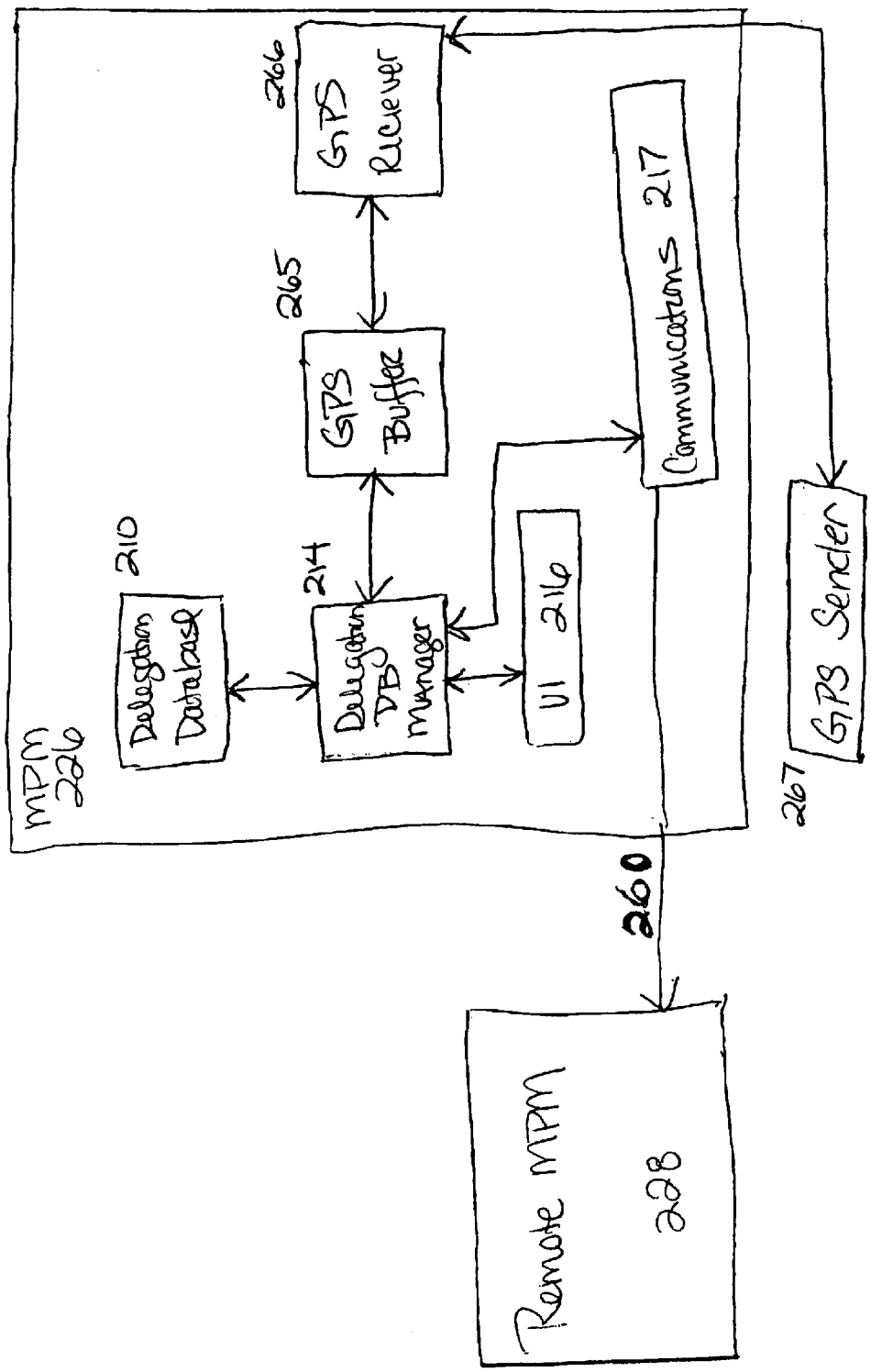
FIG. 8 illustrates an example of a permission embedded in a cookie within an http request.
Figure 10:
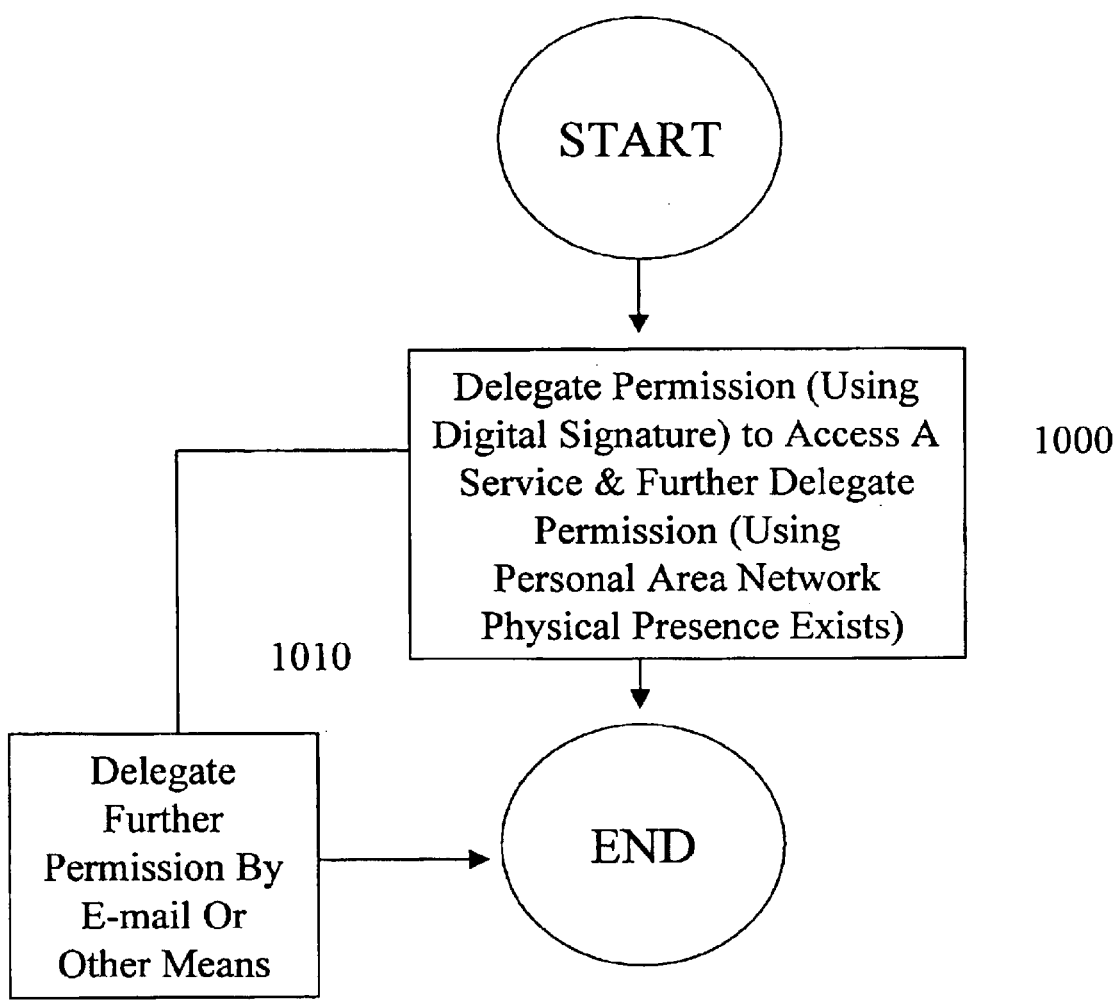
FIG. 10 depicts a flow chart of a method for managing access to services in accordance with a preferred embodiment of the present invention.

The request includes certain credential information that is required in order for the requester to be permitted access to the service. The credential information may include identity and key information and permission information relating to the service. The credential information may be transmitted by various credential transmission mechanisms. The credential transmission mechanism must be capable of sending the credentials from the browser to the web server. In the preferred embodiment, the credential information is sent as part of a header within an HTTP request. FIG. 7 provides an example of a permission embedded in the header of an http request for a web page. In an alternative embodiment, the credential information is sent as part of a cookie within an HTTP request. FIG. 8 illustrates an example of a permission embedded in a cookie. In still another embodiment, the credential information is sent as part of a URL. FIG. 10 illustrates an example of a permission embedded in a URL.

Thus, for example, with reference to FIG. 2A, as a requestor makes a request through browser 225 to access the service by supplying a URL, viewer 224 checks to see if it has any credential information corresponding to that URL. If it does, viewer 224 will add the credential information, for example, as part of a header of an http request for a web page, in a cookie within an http request or as part of the URL. The credential information is received by web server 220 and checked by access control server 221 in connection with access control database 222. It will be determined whether access is permitted.

Assuming the credential information is accepted, and the delegatee is permitted to access the service, the service may be sent to the delegatee over a computer network. In the preferred embodiment, this computer network used to access the service may be different from the personal area network, and may be, in some embodiments, a public network such as the Internet. In other embodiments, the computer network is a personal area network. In some instances, the delegates may be denied access to the service. This may occur if, for example, the permission granted by the delegator was limited in duration and the delegatee attempted to access the service after the permission had expired. In another example, the delegator may have revoked permissions delegated at the location (identified, for example, by a GPS receiver) at which the delegatee's permission was delegated.

Figure 2C:
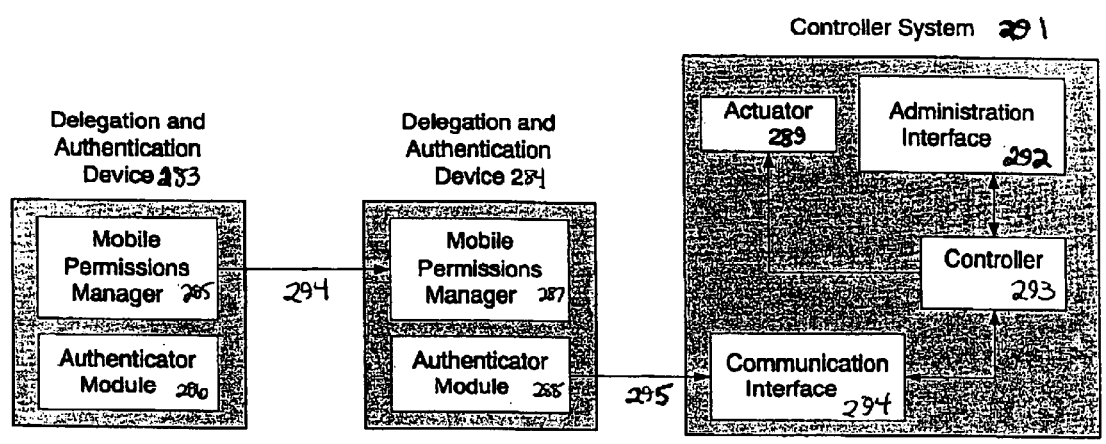
FIG. 2C illustrates a system of an alternate embodiment of the present invention.

In some embodiments, the services that the delegatee has received permission to access are related to the actuation of a device. For example, the delegatee may seek permission from a delegator to open a door, thereby gaining access to a building, or to start a motor. With reference to FIG. 2C, the delegator using device 283 delegates permission to access the service to delegatee via device 284. Devices 283 and 284 include mobile permissions manager 285 and 287, which are analogous or identical to mobile permissions manager 226 of FIG. 2A. The delegation is performed over a personal area network in the manner described with reference to remote device 228 and mobile permissions manager 226 of FIG. 2A and FIGS. 1A, 1B and 1D. Link 294 of FIG. 2C corresponds with delegation link 260 of FIG. 2A. Authenticator module 288 transmits the permission to communication interface 294 of controller system 291 over link 295, seeking access to the service. Communication interface 294 may be, in some embodiments, an IR port or Bluetooth antenna. Communication interface 294 communicates with controller 293, which determines whether to provide the delegatee with access to the services. This authentication may be accomplished, in some embodiments, using a standard authentication protocol such as ISO/IEC9798-3. Assuming it is determined that the delegates has permission access to the service, controller 293 signals actuator 289 thereby triggering actuator 289 to perform the service, resulting in, for example, opening a door. Administration interface 292 is used for various administrative functions such as, for example, configuring root permissions or reviewing an access log.

It will be understood by those skilled in the art that the present invention can be used to control access to any number of different services, including obtaining access to services that involve control of any computerized device.

Having discussed the systems of and apparatus used in connection with the present invention, the methods of the present invention will now be discussed with reference to FIGS. 10–17.

With reference to FIG. 10, a method for managing access to a service is shown. In step 1000, permission is delegated to a delegates by a delegator. The permission is represented using a digital signature and includes authority to access the service and delegate one or more further permissions to one or more subsequent delegatees. At least one delegation of permission occurs over a personal area network while physical presence exists between the delegator and the delegatee. The personal area network may comprise two or more devices which transmit data by infrared light waves, or digital short-range radio waves. In some embodiments, in step 1010, one or more of the further permissions are delegated to one or more subsequent delegatees via electronic mail or other means.

Figure 11:
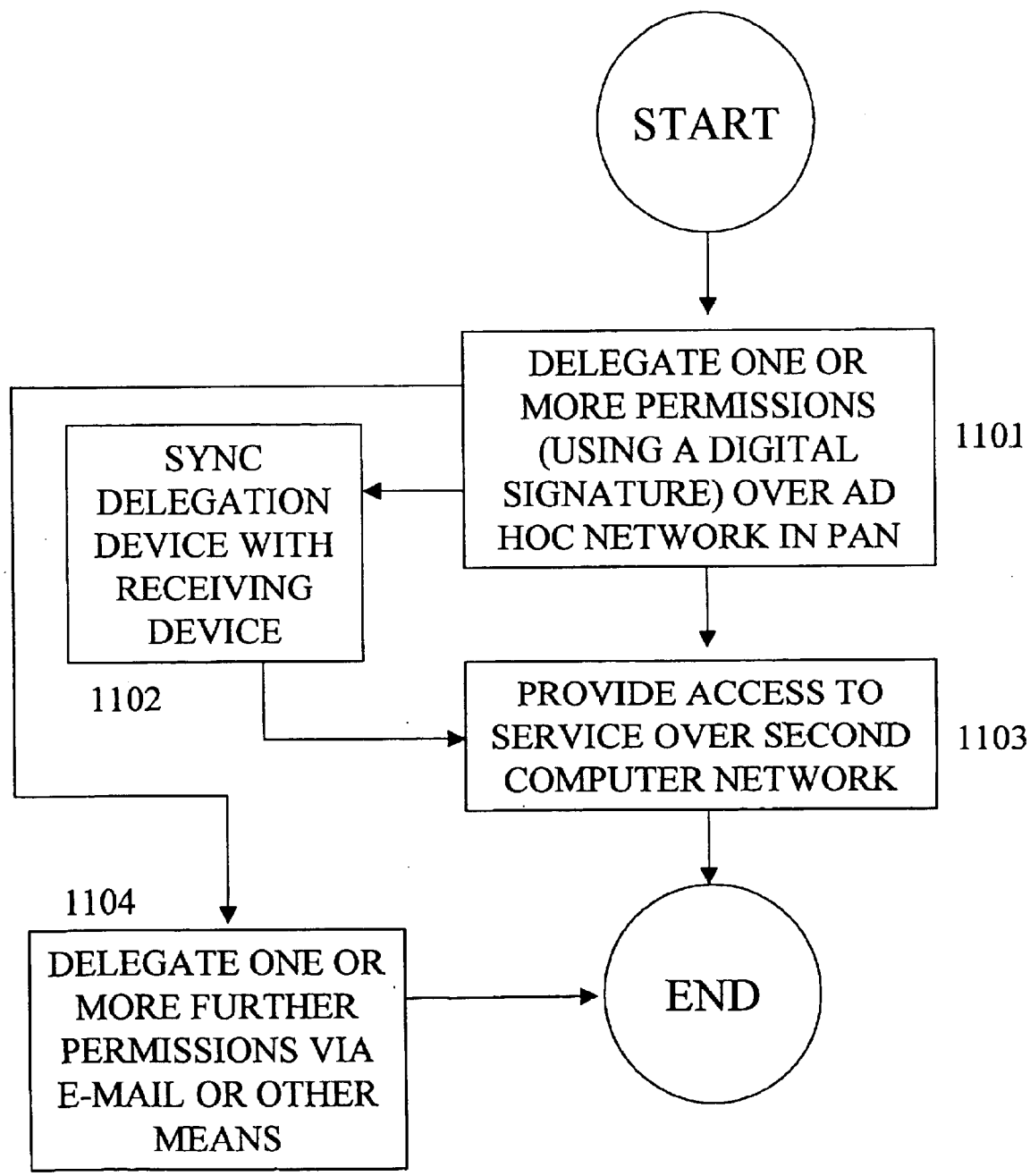
FIG. 11 depicts a flow chart of a method for managing access to services in accordance with a preferred embodiment of the present invention.

With reference to FIG. 11, a method for managing access to a service is shown. In step 1101, one or more permissions are delegated to a delegatee by a delegator over at least one ad hoc network in a personal area network. The one or more permissions relate to the service and comprise authority to access the service and to delegate one or more further permissions to subsequent delegatees. The permissions are represented using a digital signature. In step 1103, access to the service is provided to each permitted delegatee over a second computer network that is different from the personal area network. In an alternate embodiment, in step 1102, first data comprising the one or more permissions on the delegation device is synchronized with second data on a receiving device. In another embodiment, in step 1104, one or more further permissions to subsequent delegatees are delegated via electronic mail or other means. The personal area network may comprise two or more devices that transmit data by infrared light waves or short-range radio waves. The second computer network comprises a public network, such as the Internet. The delegation of permission may be performed by a personal digital assistant. The service may be accessed by a personal computer over the second computer network.

Figure 12:
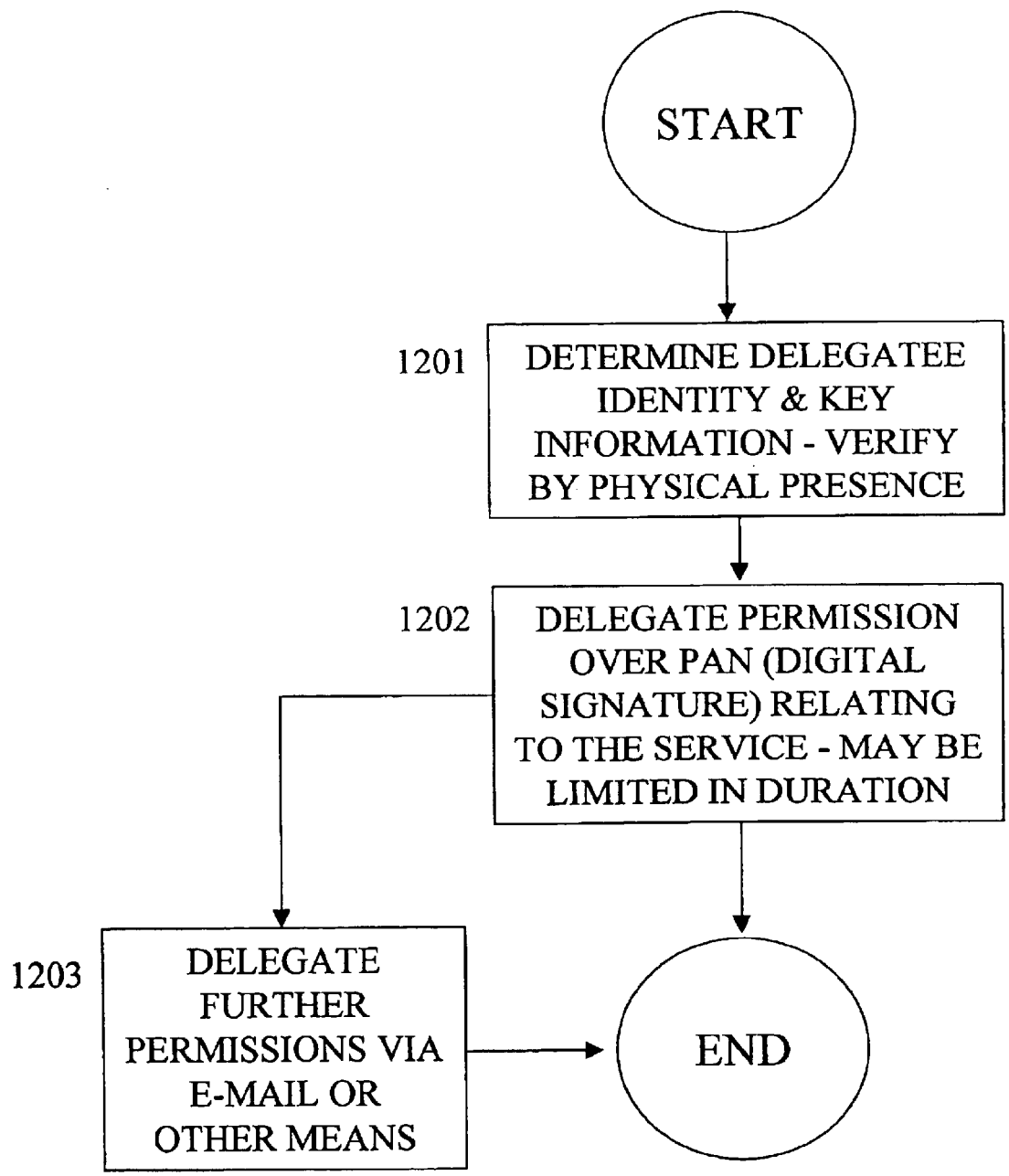
FIG. 12 depicts a flow chart of a method for controlling access to services in accordance with a preferred embodiment of the present invention.

With reference to FIG. 12, a method for controlling access to a service is shown. In step 1201, identity and key information of a delegatee is determined. In step 1202, permission is delegated to the delegatee over a personal area network. The permission is represented using a digital signature and relates to the service. Steps 1201 and 1202 are performed by a delegator that verifies the identity and key information through physical presence of said delegatee. The permission may include permission to access the service and/or to delegate one or more further permissions to one or more subsequent delegatees. In an alternative embodiment, in step 1203, one or more of the further permissions are delegated to one or more subsequent delegatees via electronic mail or other means, such as transferring by disc. The permissions may be limited in duration. In some embodiments, in steps 1201 and 1202, the delegator verifies the identity and key information only through physical presence of the delegatee.

Figure 13:
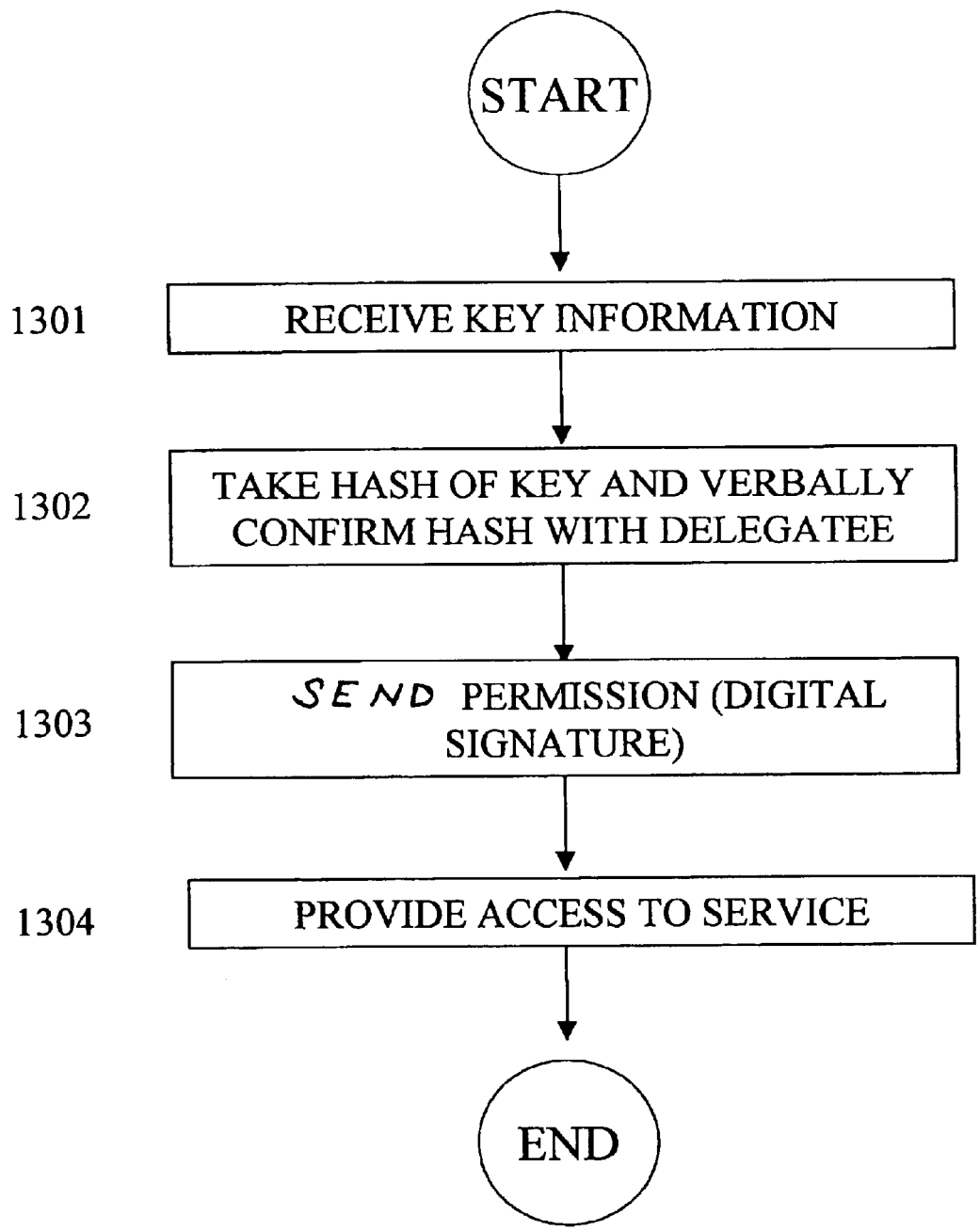
FIG. 13 depicts a flow chart of a method for controlling access to services in accordance with a preferred embodiment of the present invention.

With reference to FIG. 13, a method for controlling access to a service is shown. In step 1301, key information is received from a delegatee over a computer network. In step 1302, a hash of the key is taken and the hash is verbally confirmed with the delegatee. In step 1303, permission to access the service is sent by a delegator to the delegatee. The permission is represented using a digital signature. After that, the delegatee is provided access to the service in step 1304.

Figure 14:
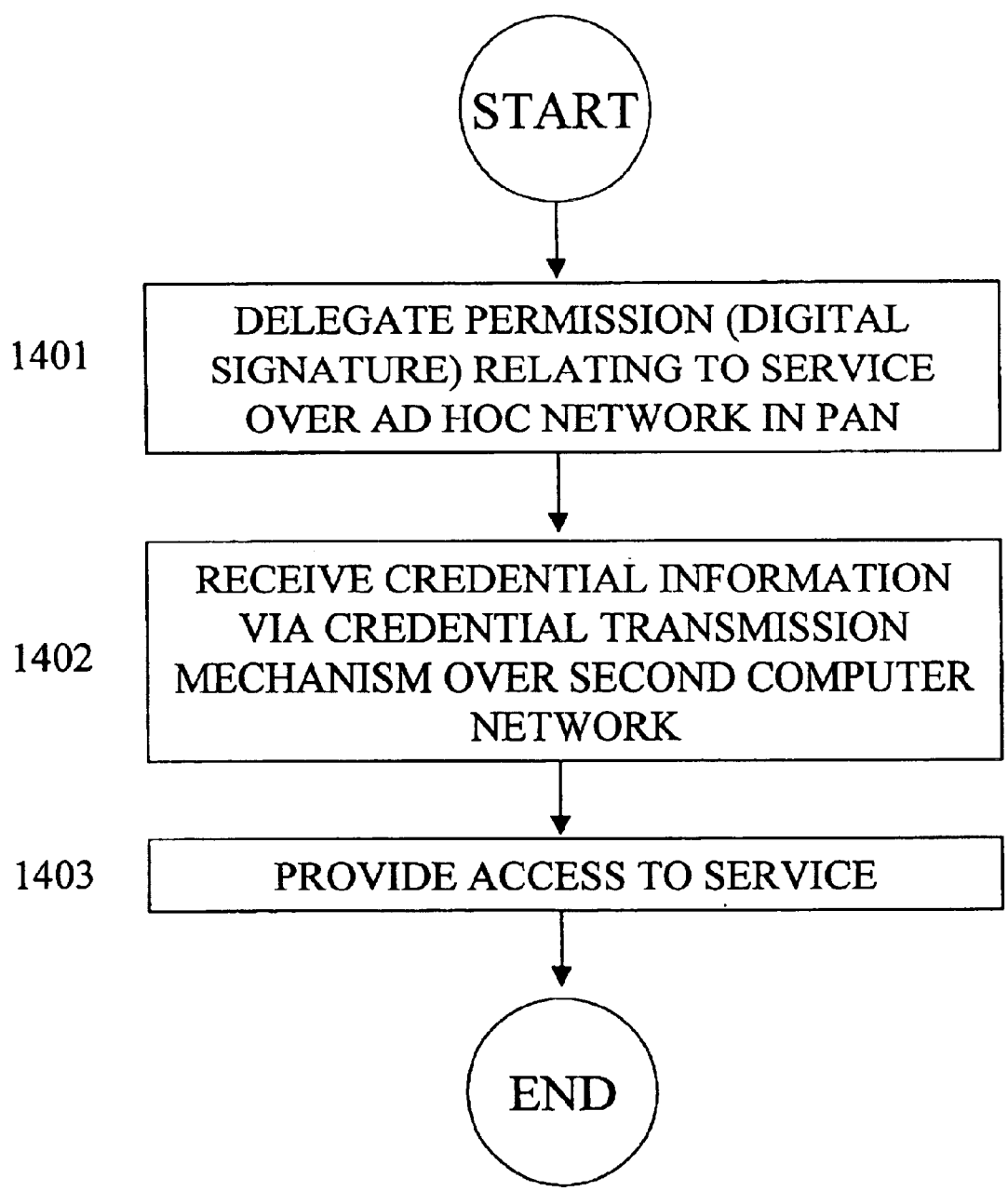
FIG. 14 depicts a flow chart of a method for managing access to services in accordance with a preferred embodiment of the present invention.

With reference to FIG. 14, a method for managing access to a service is shown. In step 1401, at least one permission is delegated to a delegatee by a delegator, over at least one ad hoc network in a personal area network. The permission includes authority to access the service and to delegate one or more further permissions to subsequent delegatees and is represented using a digital signature. In step 1402, data representing credential information relating to the permission is received from at least one of said permitted delegatees via a credential transmission mechanism over a second computer network that is different from the personal area network. In step 1403, access to the service is provided to at least one of said permitted delegatees over said second computer network. The credential transmission mechanism may comprise including the data in a header of an http request for a web page, a cookie within an http request or a URL. The personal area network may comprise two or more devices that transmit data by infrared light waves or digital short-range radio waves.

Figure 15:
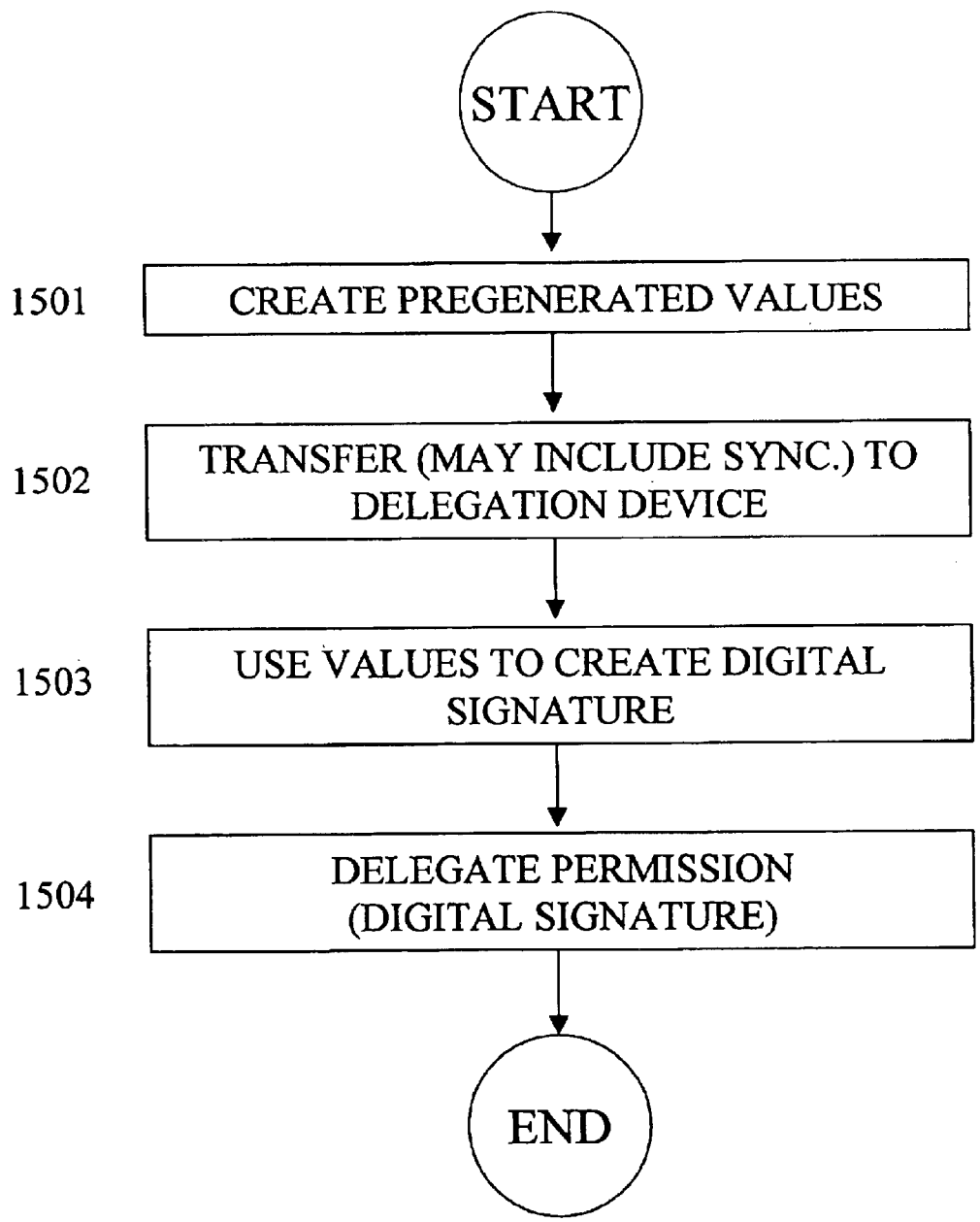
FIG. 15 depicts a flow chart of a method for expediting delegation of at least one permission in accordance with a preferred embodiment of the present invention.

With reference to FIG. 15, a method for expediting delegation of at least one permission over at least one personal area network via a delegation device is shown. In step 1501, pregenerated values representing at least a portion of data required to create a digital signature are created on one or more computers. In step 1502, the values are transferred to the delegation device. In step 1503, the values are used in creating a digital signature on the delegation device. In step 1504, the at least one permission is delegated by a delegator to a delegatee over the personal area network while physical presence exists between the delegator and the delegatee. The permission is represented using the digital signature and comprises authority to access a service. Step 1502 may, in some embodiments, include synchronizing the one or more computers with the delegation device. The delegation device may be a constrained device.

Figure 16:
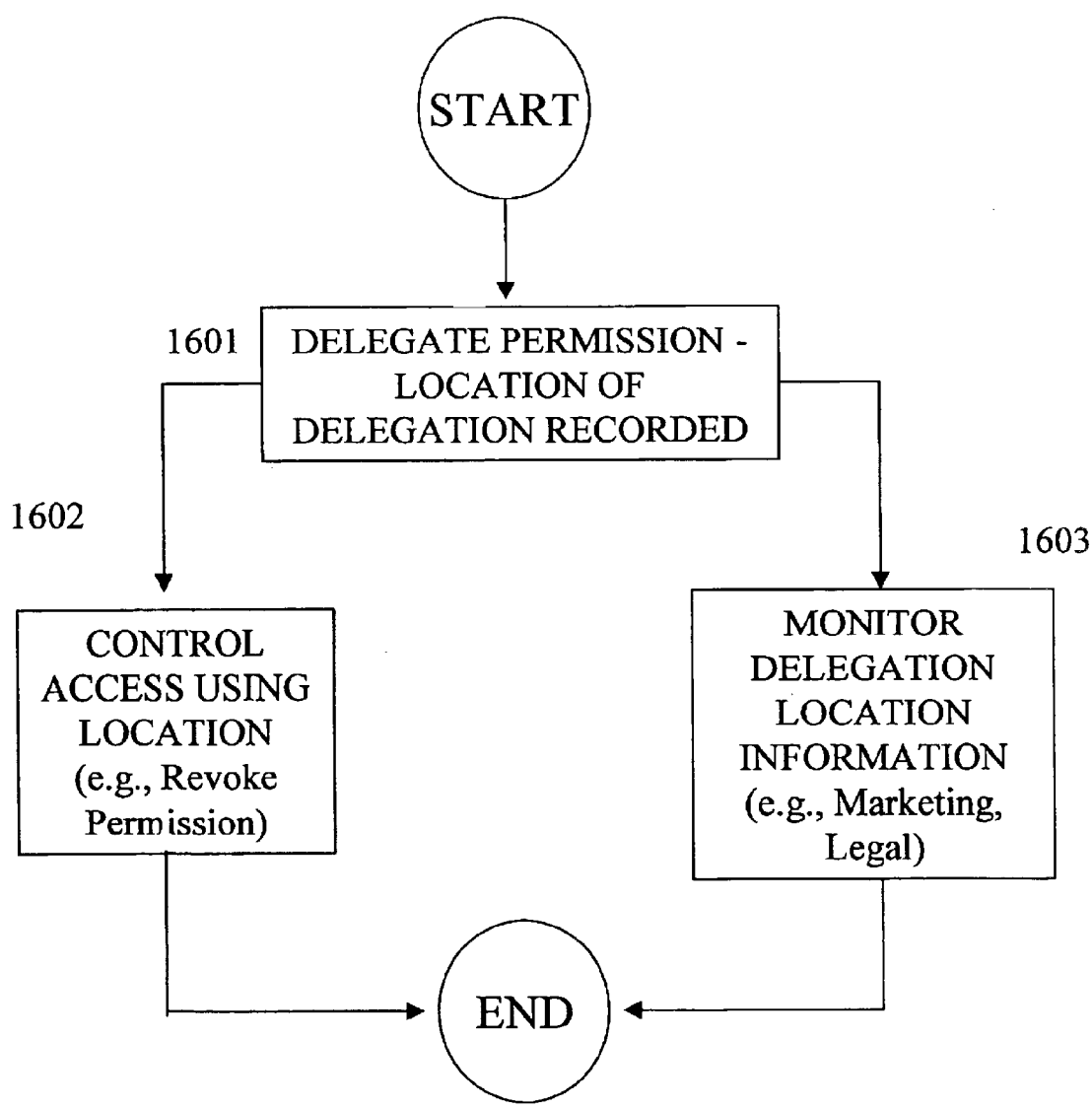
FIG. 16 depicts a flow chart of a method of managing access to services in accordance with a preferred embodiment of the present invention.

With reference to FIG. 16, a method for managing access to a service is shown. In step 1601, one or more permissions relating to the service are delegated via a delegation device. The delegation device includes a global positioning system receiver for determining a location of the delegation device at a time the delegation of one or more of the permissions occurs. In step 1602, the location may be used to control access to the service, such as revoking one or more of the permissions delegated at the location. Alternatively, in step 1603, the location is used to monitor delegation information, which may be used, for example, in connection with marketing objectives or legal requirements.

Figure 17:
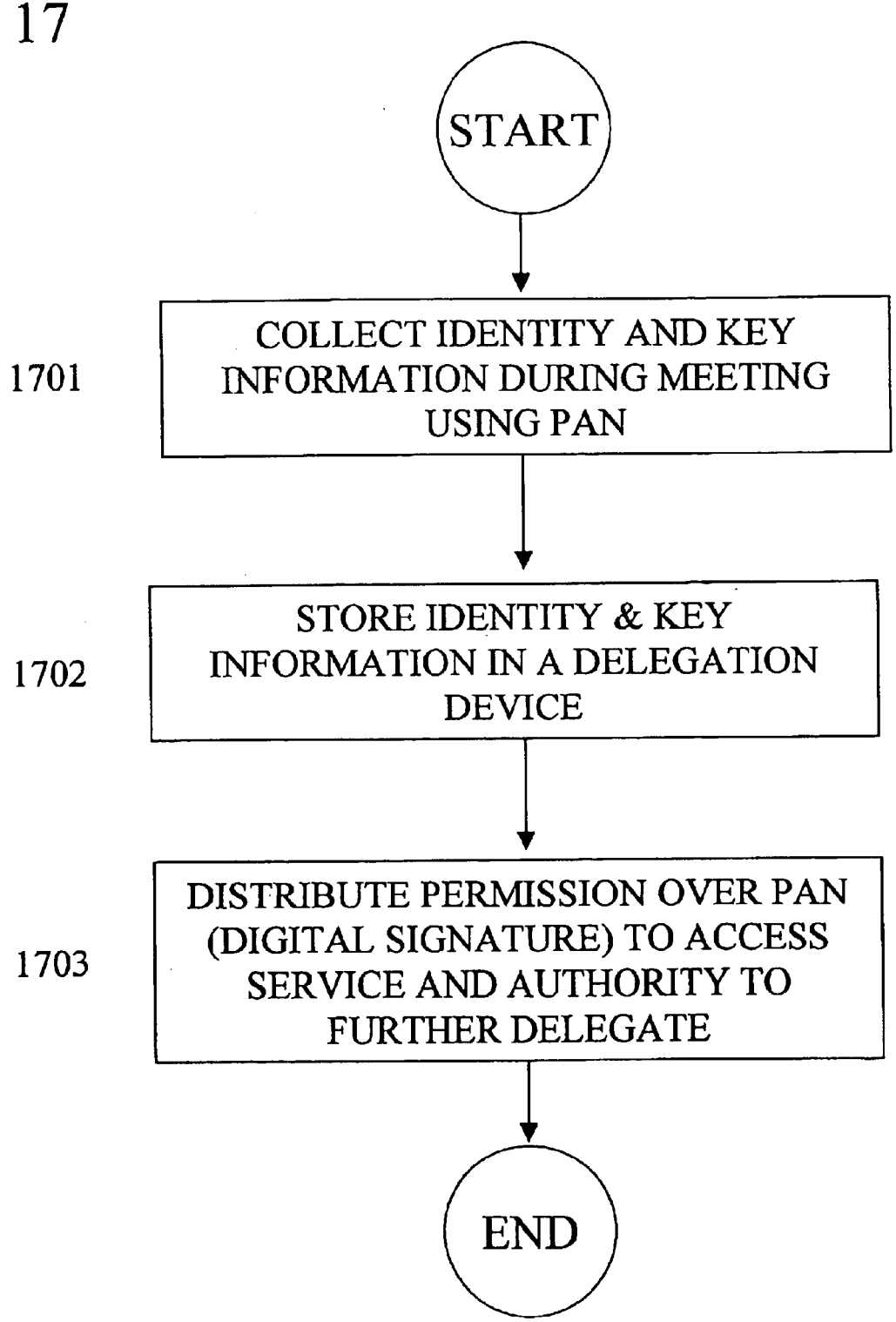
FIG. 17 depicts a flow chart of a method of automatically generating a list of participants physically present at a meeting and distributing permission to the participants, in accordance with a preferred embodiment of the present invention.

With reference to FIG. 17, a method for automatically generating a list of participants physically present at a meeting, and distributing permission to at least one of the participants is shown. In step 1701, during the meeting, identity and key information is collected from at least one of the participants using at least one first personal area network. In step 1702, the identity and key information is stored in one or more collection/distribution devices. After step 1702, in step 1703, permission to access the service is distributed to the at least one participant over at least one second personal area network using the one or more collection/distribution devices. The permission is represented using a digital signature. The first personal area network and the second personal area network may be the same or different. The one or more collection/distribution devices may be personal digital assistants. The permission may comprise the authority to delegate further permissions to subsequent delegatees. The first personal area network and the second personal area network may comprise two or more devices that transmit data by infrared light waves or by digital short-range radio waves.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed:

1. A graphical user interface on a delegation device comprising:

one or more movable subject icons representing one or more subjects physically present at a meeting and from whom identity and key information has been collected using at least one first personal area network, which identity and key information is stored on the delegation device; and one or more movable object icons relating to one or more permissions to access a service wherein said permissions are distributed to said one or more subjects over at least one second personal area network using the delegation device and wherein said permissions are represented using a digital signature;

wherein said subject icons are associated with said object icons by physically associating said subject icons with said object icons.

2. The graphical user interface of claim 1 wherein said first personal area network and said second personal area network are the same.

3. The graphical user interface of claim 1 wherein said first personal area network and said second personal area network are different.

4. The graphical user interface of claim 1 wherein the service comprises accessing content.

5. The graphical user interface of claim 1 wherein the service comprises actuating a device.

* * * * *